(12) United States Patent
Jeong et al.

(10) Patent No.: US 10,838,242 B2
(45) Date of Patent: Nov. 17, 2020

(54) DISPLAY DEVICE WITH PROTECTION PLATE HAVING LARGER REAR SURFACE AREA THAN FRONT SURFACE OF FRONT SUBSTRATE AREA

(71) Applicant: LG ELECTRONICS INC., Seoul (KR)

(72) Inventors: Mingeun Jeong, Seoul (KR); Bumgi Min, Seoul (KR); Hayun Lee, Seoul (KR); Cheolsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 15/533,841

(22) PCT Filed: Aug. 13, 2015

(86) PCT No.: PCT/KR2015/008509
§ 371 (c)(1),
(2) Date: Jun. 7, 2017

(87) PCT Pub. No.: WO2016/093464
PCT Pub. Date: Jun. 16, 2016

(65) Prior Publication Data
US 2017/0336669 A1    Nov. 23, 2017

(30) Foreign Application Priority Data
Dec. 8, 2014   (KR) .................. 10-2014-0175366

(51) Int. Cl.
G02F 1/1333 (2006.01)
G02F 1/13357 (2006.01)

(52) U.S. Cl.
CPC .. *G02F 1/133308* (2013.01); *G02F 1/133608* (2013.01); *G02F 2001/133314* (2013.01);
(Continued)

(58) Field of Classification Search
CPC ... G02F 1/133308; G02F 2001/133314; G02F 2001/133317; G02F 2001/133322;
(Continued)

(56) References Cited

U.S. PATENT DOCUMENTS 8,797,477 B2* 8/2014 Fujii ................. G02F 1/133615
349/58
8,866,759 B2* 10/2014 Furusawa ............ G06F 1/1626
345/173
(Continued)

FOREIGN PATENT DOCUMENTS

EP        2746842 A1   6/2014
JP     2010-85632 A    4/2010
(Continued)

*Primary Examiner* — Paisley L Wilson
(74) *Attorney, Agent, or Firm* — Birch, Stewart, Kolasch & Birch, LLP

(57) ABSTRACT

A display device is disclosed. The display device of present invention may comprise a display panel including a front substrate and a rear substrate, the rear substrate coupled with a rear portion of the front substrate; a frame coupled with the display panel, the frame positioned at a rear of the display panel; a back cover coupled with the frame, the back cover positioned at a rear of the frame; a guide panel coupled with at least one of a side portion of the frame and a side portion of the back cover; and a support clip, wherein an end of the support clip is coupled with the frame, at least a portion of the support clip is in contact on the guide panel. The display device may prevent a deformation of the guide panel.

23 Claims, 33 Drawing Sheets

(52) U.S. Cl.
CPC ........... *G02F 2001/133317* (2013.01); *G02F 2001/133322* (2013.01); *G02F 2001/133331* (2013.01); *G02F 2201/503* (2013.01)

(58) Field of Classification Search
CPC ... G02F 2001/133331; G02F 1/133608; G02F 2201/503
See application file for complete search history.

(56) References Cited

U.S. PATENT DOCUMENTS

| | | |
|---|---|---|
| 2009/0066862 A1 | 3/2009 | Ishii et al. |
| 2011/0227848 A1 | 9/2011 | Furusawa |
| 2012/0105761 A1 | 5/2012 | Lee et al. |
| 2012/0182700 A1 | 7/2012 | Byeon et al. |
| 2012/0218491 A1* | 8/2012 | Min ................ G02F 1/133308 349/58 |
| 2012/0281383 A1* | 11/2012 | Hwang ............ G02F 1/133308 361/807 |

FOREIGN PATENT DOCUMENTS

| | | |
|---|---|---|
| KR | 10-2008-0038886 A | 5/2008 |
| KR | 10-2008-0057875 A | 6/2008 |
| KR | 10-2012-0044734 A | 5/2012 |
| KR | 10-2013-0030363 A | 3/2013 |
| KR | 10-2013-0112147 A | 10/2013 |
| KR | 10-2014-0080138 A | 6/2014 |
| KR | 10-2014-0082557 A | 7/2014 |

* cited by examiner

DISPLAY DEVICE WITH PROTECTION PLATE HAVING LARGER REAR SURFACE AREA THAN FRONT SURFACE OF FRONT SUBSTRATE AREA

CROSS REFERENCE TO RELATED APPLICATIONS

This application is the National Phase of PCT International Application No. PCT/KR2015/008509, filed on Aug. 13, 2015, which claims priority under 35 U.S.C. 119(a) to Patent Application No. 10-2014-0175366, filed in the Republic of Korea on Dec. 8, 2014, all of which are hereby expressly incorporated by reference into the present application.

TECHNICAL FIELD

The present invention relates to a display device capable of preventing deformation of a guide panel.

BACKGROUND ART

As the information society develops, the demand for display devices is increasing in various forms. In recent years, various display devices such as a liquid crystal display device (LCD), a plasma display panel (PDP), an electro luminescent display (ELD), and a vacuum fluorescent display (VFD) have been studied and used.

There is a need for a method that can easily combine a display device composed of multiple parts.

DISCLOSURE

Technical Problem

The present invention is directed to solving the above-mentioned problems and other problems. Another object of the present invention is to provide a display device capable of preventing the guide panel from being deformed.

Technical Solution

In one aspect, there is provided a display device comprising: a display panel including a front substrate and a rear substrate, the rear substrate coupled with a rear portion of the front substrate; a frame coupled with the display panel, the frame positioned at a rear of the display panel; a back cover coupled with the frame, the back cover positioned at a rear of the frame; a guide panel coupled with at least one of a side portion of the frame and a side portion of the back cover; and a support clip. An end of the support clip may be coupled with the frame, and at least a portion of the support clip may be in contact on the guide panel.

According to another aspect of the present disclosure, the end of the support clip may be coupled with the rear of the frame, and another end of the support clip may be positioned adjacent to the side portion of the frame.

According to another aspect of the present disclosure, the at least the portion of the support clip may be between the end of the support clip and the other end of the support clip, and the at least the portion of the support clip may be in contact with an inner surface of the guide panel.

According to another aspect of the present disclosure, the guide panel may include a stopper protruding toward the frame, and the stopper may be positioned adjacent to a rear surface of the frame.

According to another aspect of the present disclosure, the guide panel may include a protrusion projecting toward the frame, and the protrusion may be positioned adjacent to a front surface of the frame.

According to another aspect of the present disclosure, the end of the support clip may be coupled with a rear surface of the frame, and another end of the support clip may be coupled with the guide panel.

According to another aspect of the present disclosure, the guide panel may comprise: a protrusion extended toward the frame, the protrusion positioned adjacent to a rear surface of the frame; and a contact portion bent and extended from the protrusion, the contact portion in contact with the rear surface of the frame, the contact portion aligned along the rear surface of the frame.

According to another aspect of the present disclosure, an end of the frame may be extended to be in contact with the side portion of the guide panel.

According to another aspect of the present disclosure, the guide panel may be placed adjacent to a rear surface of the display panel.

According to another aspect of the present disclosure, the display device may further comprise a backlight unit between the display panel and the frame.

According to another aspect of the present disclosure, the display device may further comprise a resin portion positioned at a side portion of the display panel, and the resin portion may include a plurality of layers.

According to another aspect of the present disclosure, the resin portion may include: a first resin portion in contact with the display panel; and a second resin portion in contact with the first resin portion, and the first resin portion may be between the display panel and the second resin portion, and one of the first resin portion and the second resin portion may be softer than another of the first resin portion and the second resin portion.

According to another aspect of the present disclosure, the display panel may include a inclined portion, the inclined portion of the display panel may be formed on at least one of a side surface of the front substrate and a side surface of the rear substrate.

According to another aspect of the present disclosure, an area of the front substrate may be different from an area of the rear substrate.

According to another aspect of the present disclosure, the display panel may include a protection plate attached to a front surface of the front substrate, and an area of the protection plate may be larger than at least one of an area of the front substrate and an area of the rear substrate.

According to another aspect of the present disclosure, the display device may further comprise a resin portion at a side portion of the display panel, and the resin portion may include a plurality of layers, and a portion of the resin portion may protrude with respect to the protection plate.

According to another aspect of the present disclosure, the display device may further comprise a resin portion at a side portion of the display panel, and the resin portion may include a plurality of layers, and the resin portion may be in contact with a rear surface of the protection plate.

Advantageous Effects

Effects of the display device according to the present invention will be described as follows.

According to at least one of the embodiments of the present invention, there is an advantage that deformation of the guide panel can be prevented.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will become apparent to those skilled in the art.

MODE FOR INVENTION

Figure 1:
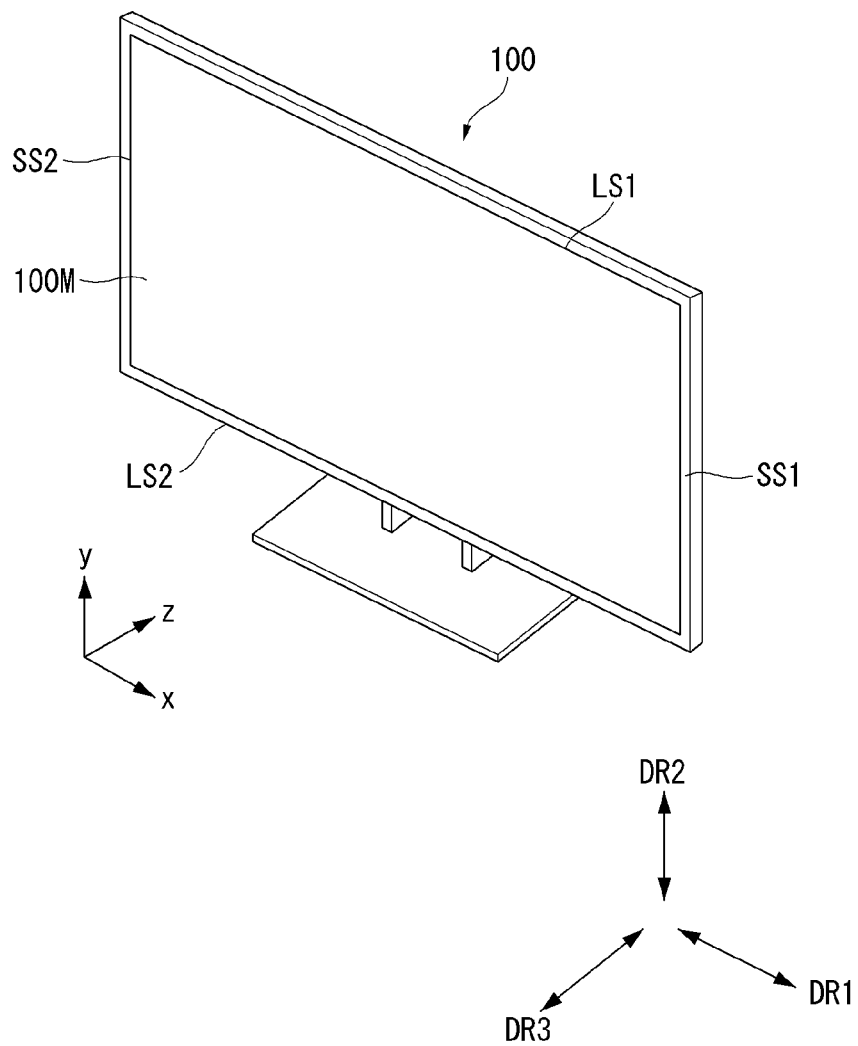
FIGS. 1 and 2 are views showing a display device according to an embodiment of the present invention.

Hereinafter, a display device according to the present invention will be described in detail with reference to the accompanying drawings.

Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display device 100 may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100.

Further, a third direction DR3 may be a direction vertical to the first direction DR1 and/or the second direction DR2.

In the embodiment disclosed herein, the first direction DR1 and the second direction DR2 may be commonly referred to as a horizontal direction.

Further, the third direction DR3 may be referred to as a vertical direction.

Figure 2:
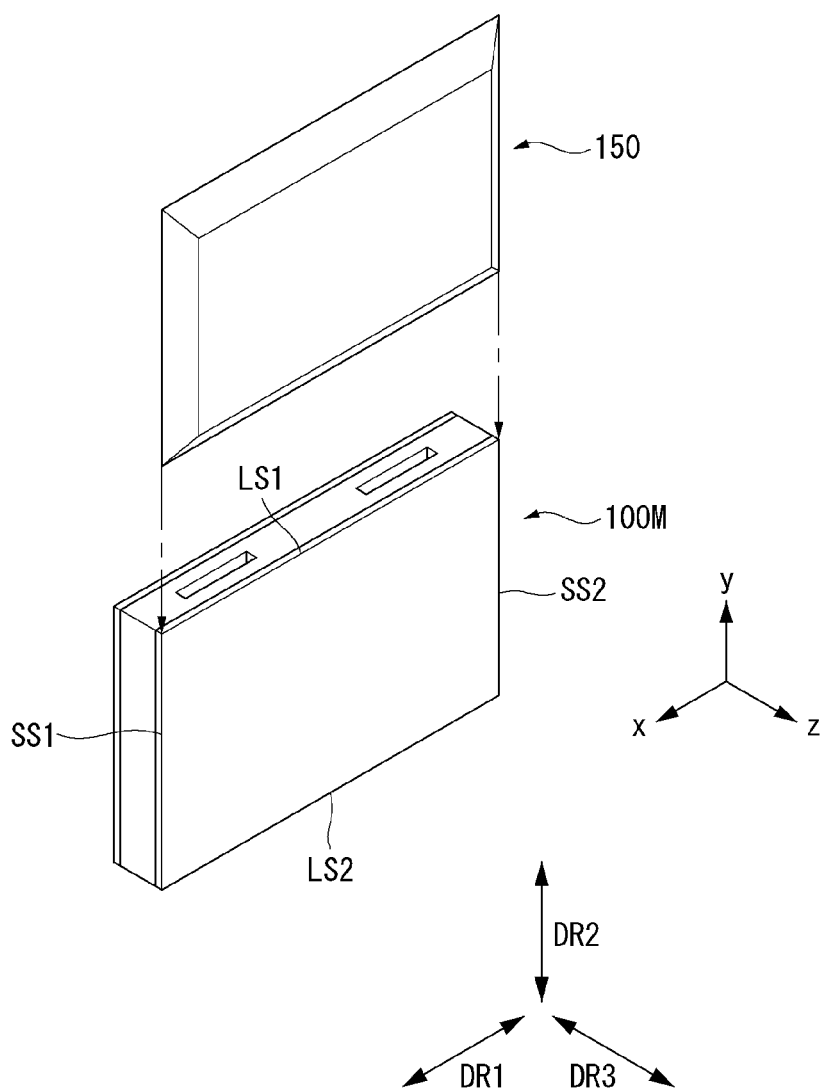

FIGS. 1 and 2 are views showing a display device according to an embodiment of the present invention.

A display device 100 according to an embodiment of present invention, may comprise a display module 100M and a back cover 150. The back cover 150 may be positioned behind the display module 100M.

The back cover 150 may be connected to the display module 100M in a sliding manner in a direction from the first long side LS1 toward the second long side LS2, that is, in the second direction DR2. In other words, the back cover 150 may be fitted into the display module 100M by being sliding vertically.

In order to slideably connect the back cover 150 to the display module 100M, the back cover 150 and/or other structures adjacent thereto may include protrusions, sliding portions, engaging portions, and the like.

Figure 3:
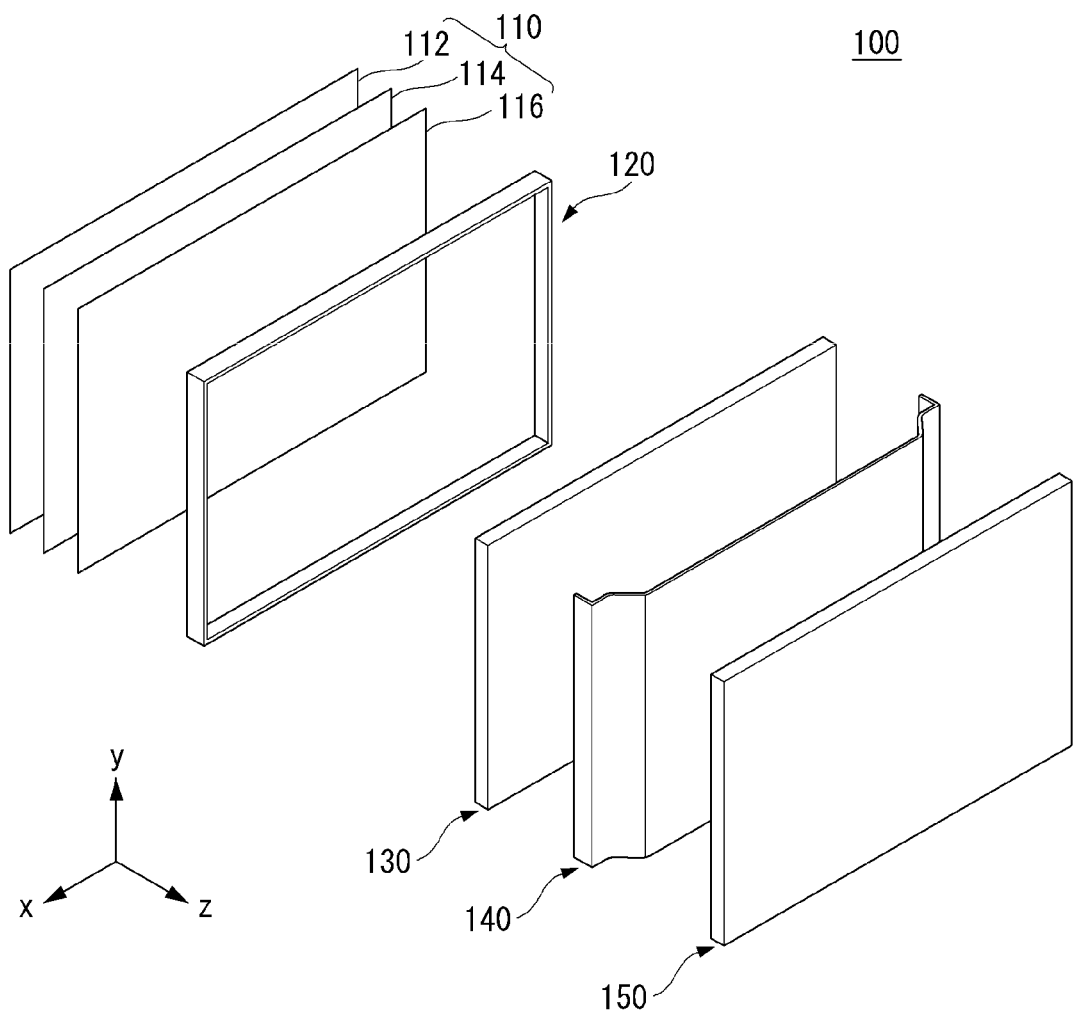
FIG. 3 is an exploded perspective view of the display device of FIG. 1.

FIG. 3 is an exploded perspective view of the display device of FIG. 1.

The display device 100 according to an embodiment of the present invention may include a display panel 110, a guide panel 120, a backlight unit 130, a frame 140, and a back cover 150.

The display panel 110 may display an image according to a control signal of a control unit. The display panel 110 may be composed of a plurality of layers. For example, the display panel 110 may include a front substrate 114 and a rear substrate 116.

The front substrate 114 and the rear substrate 116 may be substantially the same size. Between the front substrate 114 and the rear substrate 116, a sealing portion for sealing the liquid crystal layer may be disposed. On the front surface of the front substrate 114, a protection plate 112 may be positioned.

The protection plate 112 may protect the display panel 110 from damage or scratches due to an external impact. The protection plate 112 may be substantially transparent. The protection plate 112 may be made of a material having higher rigidity and/or hardness in comparison to the front substrate 114 and/or the rear substrate 116. The size of the protection plate 112 may be different from that of the front substrate 114 and/or the rear substrate 116. For example, the width of the protection plate 112 may be greater than the width of the front substrate 114 and/or the rear substrate 116.

The guide panel 120 may be located at the outer circumference of the display panel 110. For example, the guide panel 120 may be coupled to at least one of the display panel 110, the frame 140, the backlight unit 130, and the back cover 150. The guide panel 120 may be exposed to the outside at the front of the display device 100 and/or at the side of the display device 100. For example, the guide panel 120 may constitute a bezel of the display device 100.

The guide panel 120 may be coupled to the display panel 110. That is, by the guide panel 120, the display panel 110 may be coupled to another parts of the display device 100.

The backlight unit 130 may include a plurality of light sources. The plurality of light sources may be placed in a manner of a direct type or a edge type.

The backlight unit 130 may be coupled to a front side of the frame 140. For example, the plurality of light sources may be placed at the front side of the frame 140. In this case, the backlight unit 130 may be called direct typed backlight unit.

The backlight unit 130 may include an optical sheet. The optical sheet may diffuse the light of the light source. The optical sheet may be composed of a plurality of layers. For example, the optical sheet may include at least one prism sheet and/or at least one diffusion sheet.

The frame 140 may support each component of the display device 100. For example, a configuration such as a backlight unit 130 or the like may be coupled to the frame 140. The frame 140 may be made of a metal such as an aluminum alloy.

The back cover 150 may be coupled to the rear portion of the display device 100. The back cover 150 may cover or shield the rear of the frame 130.

FIGS. 4 to 12 are views showing a display panel of the display device of FIG. 1.

A display panel 110 of a display device 100 according to an embodiment of the present invention may include a resin portion 111 for protecting the display panel 110.

Figure 4:
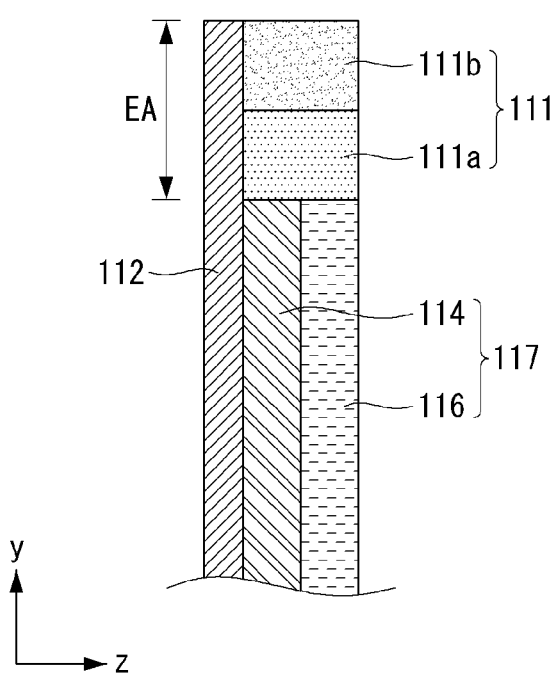
FIGS. 4 to 12 are views showing a display panel of the display device of FIG. 1.

Referring to FIG. 4, the resin portion 111 may be located at a side surface of the display panel 110. For example, the resin portion 111 may be located at the side surface of the substrate 117. The resin portion 111 may be located at the side surfaces of the front substrate 114 and the rear substrate 116. The resin portion 111 may be located along at least one of the four edges of the front substrate 114 and the rear substrate 116.

The resin portion 111 may protect the display panel 110. The resin portion 111 may protect the display panel 110 from the impact applied on the side surface of the display panel 110.

The resin portion 111 may have properties different from those of the substrate 117. For example, the resin portion 111 may include an elastic material. When an impact is applied to the resin portion 111, the resin portion 111 may be elastically deformed and may absorb the impact.

The resin portion 111 may be composed of a plurality of layers. For example, the resin portion 111 may include a first resin portion 111a contacting the side surface of the substrate 117, a second resin portion 111b located outside the first resin portion 111a. The first and second resin portions 111a and 111b may be stacked sequentially from the substrate 117.

The first and second resin portions 111a and 111b may have different properties from each other. The first and second resin portions 111a and 111b may be different in terms of material. For example, the second resin portion 111b may be soft in comparison with the first resin portion 111a. In other words, the first resin portion 111a may be made of a material having a larger amount of deformation with respect to external force in comparison with the second resin portion 111b. When an external force is applied to the side surface of the substrate 117, the first resin portion 111a made of soft material may absorb the impact first, and the second resin portion 111b made of hard material may absorb the residual external force.

The first and second resin portions 111a and 111b may exhibit a unique color. The colors of the first and second resin portions 111a and 111b may be different from each other. For example, the first resin portion 111a may be a light color, and the second resin portion 111b may be a dark color. In such a case, the bright first resin portion 111a may be a design point because of its appearance.

The protection plate 112 may be coupled to the substrate 117. For example, the protection plate 112 may be fastened to the front surface of the substrate 117.

The protection plate 112 may be made of a material different from that of the substrate 117. For example, the material of the protection plate 112 may be a harder material than the substrate 117. Therefore, the protection plate 112 may protect the substrate 117 from an external impact at the front surface.

The protection plate 112 may be larger than the substrate 117. For example, there may be an extension EA that protrudes outward beyond the substrate 117.

The extension EA may be in contact with the resin portion 111. The first resin portion 111a may contact both the substrate 117 and the extension EA. The second resin portion 111b may contact both the first resin portion 111a and the extension EA.

The extension EA may protect the substrate 117 from an external impact. The extension EA may allow the resin portion 111 to be stably engaged. The area where the first and second resin portions 111a and 111b are bonded can be increased.

Figure 5:
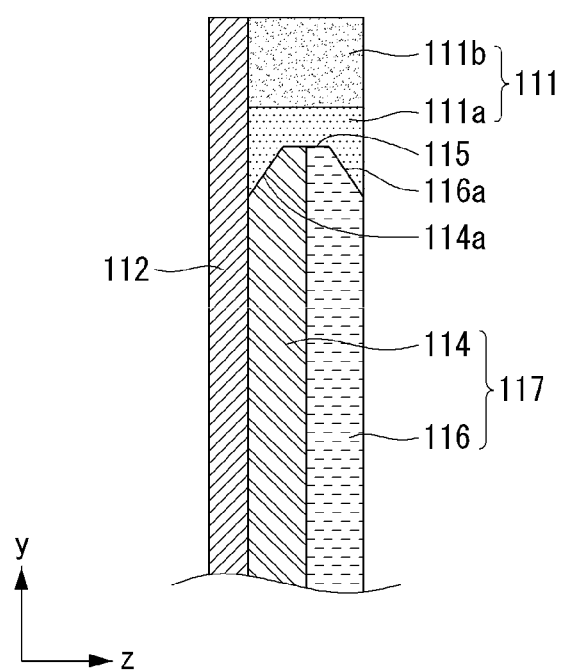

Referring to FIG. 5, the display panel 110 according to another embodiment of the present invention may have a structure in which the resin portion 111 may be more effectively bonded. For example, the first inclined portion 114a may be formed on the front substrate 114 and the second inclined portion 116a may be formed on the rear substrate 116. The first inclined portion 114a may be referred to as a first inclined surface 114a. The second inclined portion 116a may be referred to as a second inclined surface 116a. On the upper side of the substrate 117, there may be a flat portion 115 connecting the first inclined surface 114a with the second inclined surface 116a. The contact area between the substrate 117 and the resin portion 111 may be increased due to the first and second inclined surfaces 114a and 116a and the flat portion 115.

Figure 6:
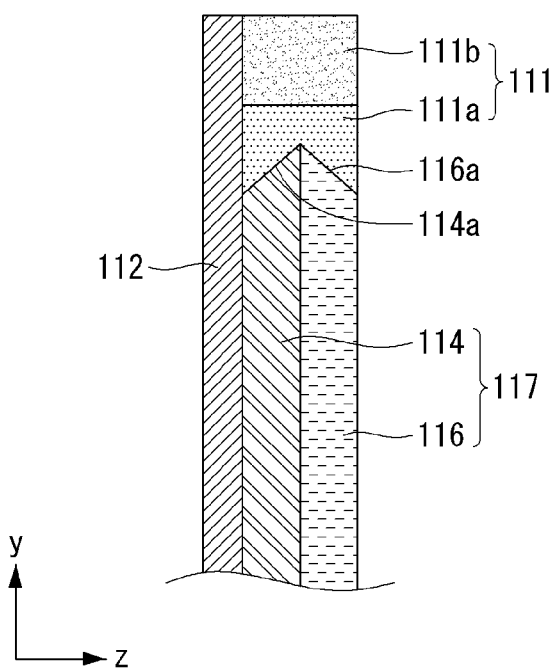

Referring to FIG. 6, the display panel 110 according to another embodiment of the present invention may include a front substrate 114 and a rear substrate 116. The first inclined surface 114a may be formed at the front substrate 114. The second inclined surface 116a may be formed at the rear substrate 116.

Figure 7:
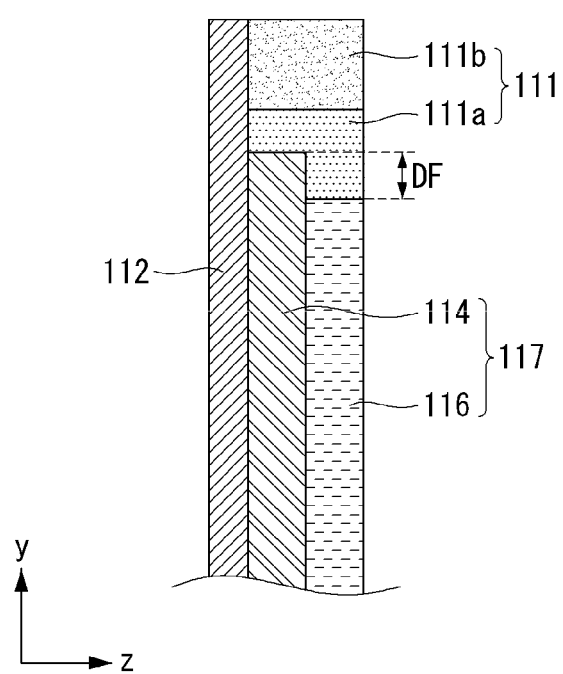
Figure 8:
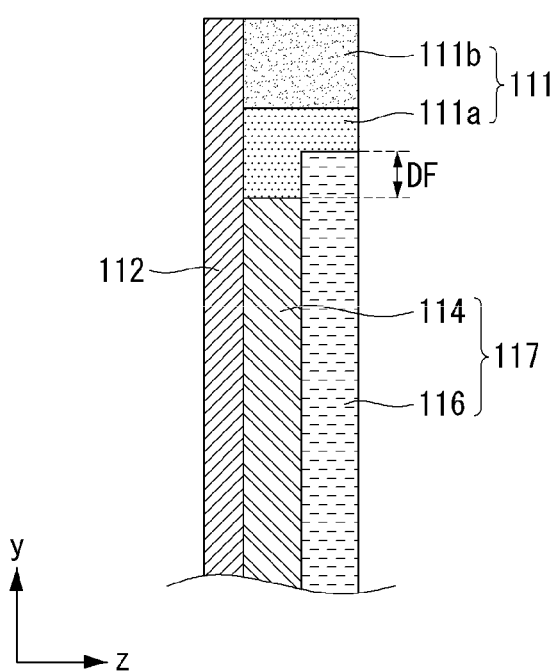

Referring to FIGS. 7 and 8, the front substrate 114 and the rear substrate 116 according to another embodiment of the present invention may be different from each other in terms of a length and/or an area.

The front substrate 114 may be longer than the rear substrate 116 or the rear substrate 116 may be longer than the front substrate 114. The difference may be DF.

When the front substrate 114 and the rear substrate 116 have different lengths, the contact area of the substrate 117 with the resin portion 111 may be increased.

Figure 9:
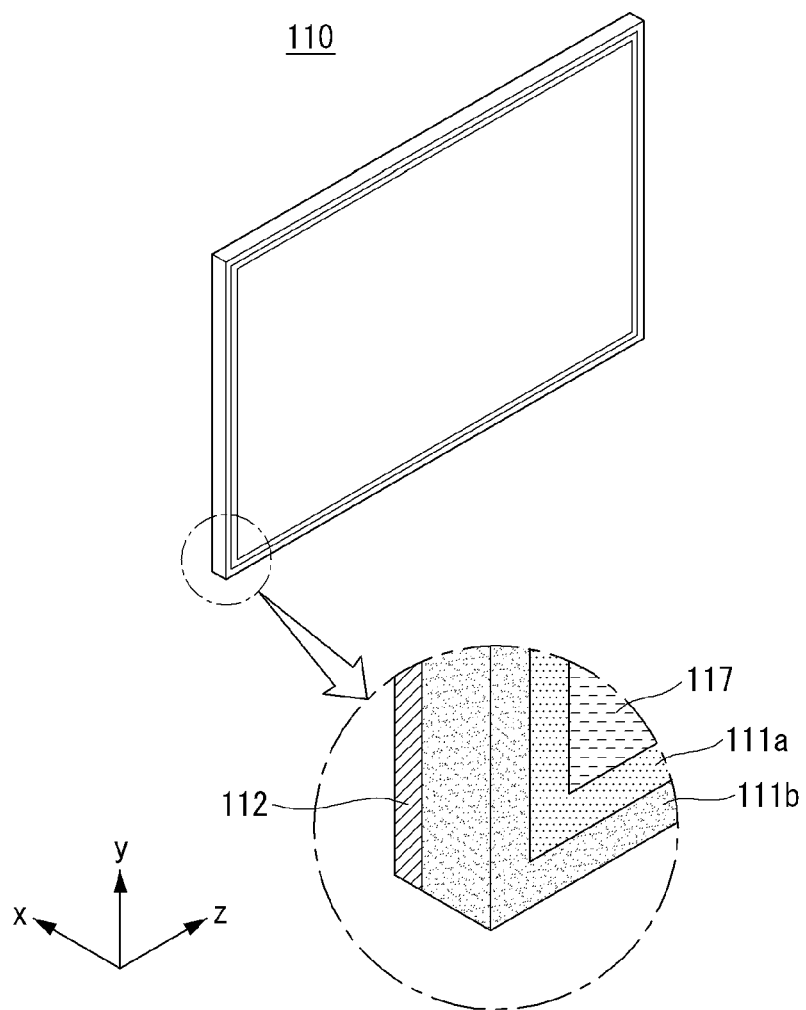

Referring to FIG. 9, the first and second resin portions 111a and 111b may be sequentially stacked from the substrate 117. The first and second resin portions 111a and 111b may be positioned along the outer periphery of the display panel 110. At least one of the first and second resin portions 111a and 111b may be located only at a specific edge of the display panel 110. For example, at least one of the first and second resin portions 111a and 111b may be provided on the long side of the upper side having a high possibility of receiving an impact from the outside. The first and second resin portions 111a and 111b may be substantially the same thickness as the substrate 117.

Figure 10:
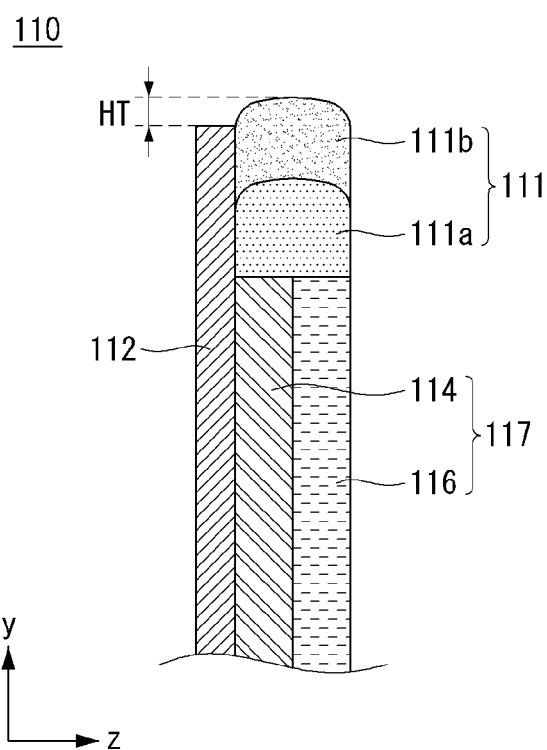

Referring to FIG. 10, the resin portion 111 may protrude from the protection plate 112. For example, the resin portion 111 may protrude as much as HT to the outside of the protection plate 112. When the resin portion 111 protrudes outward, the display panel 110 may be more effectively protected from an external impact. For example, in case that an object approaches from the outside in the Y direction, the substrate 117 may be protected from the objected, because the object may be in contact with the second resin portion 111b.

Figure 11:
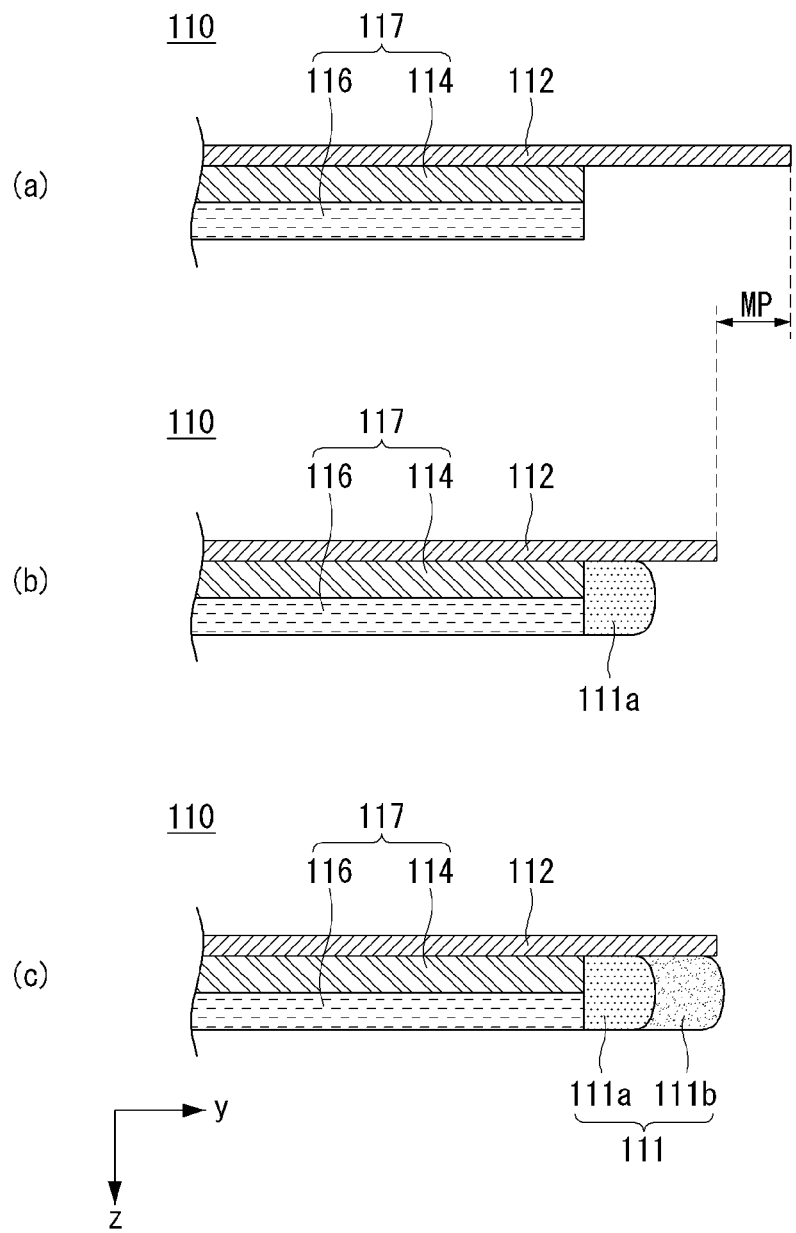
Figure 12:
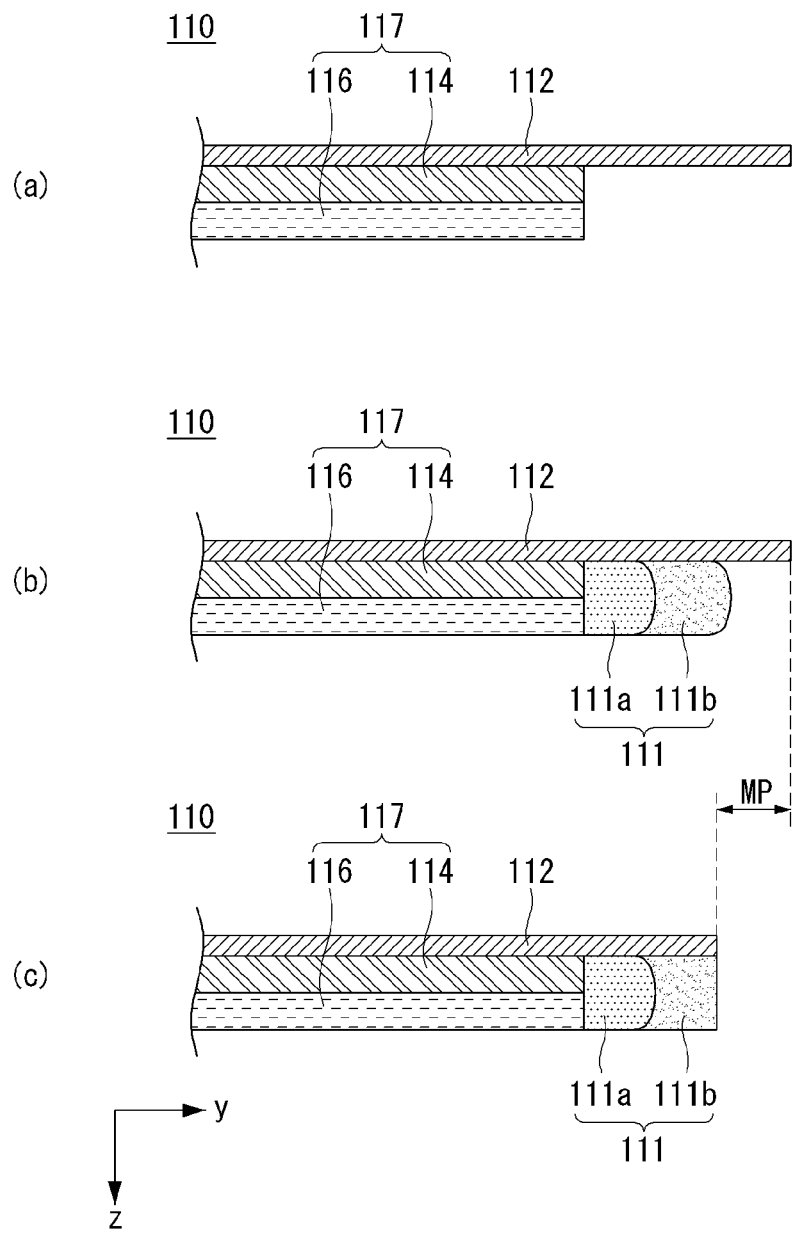

Referring to FIGS. 11 and 12, the resin portion 111 and/or the protection plate 112 may be configured according to a predetermined process sequence.

Referring to FIG. 11(a), the protection plate 112 may be attached to the front surface of the substrate 117. The protection plate 112 may be larger than the required length and/or width for the completed display panel 110. For example, the protection plate 112 to be attached, may be larger than the required length and/or width for the completed display panel 110 as much as MP.

Referring to FIG. 11(b), the protection plate 112 may be processed after being attached to the substrate 117. The margin portion MP may be removed so as to correspond to the required length and/or width of the completed display panel 110.

The first resin portion 111a may be formed together with and/or before or after the removal of the protection plate 112. For example, the first resin portion 111a may be formed on the side surface of the substrate 117 by injecting a liquid or semi-liquid resin.

Referring to FIG. 11(c), the second resin portion 111b may be coated on the first resin portion 111a. The upper portion of the first and/or second resin portions 111a and 111b may have an elliptical shape in view of the nature of the liquid or semi-liquid phase resin. The second resin portion 111b may protrude outward from the protection plate 112 due to the upper shape of the elliptical second resin portion 111b.

Referring to FIG. 12(a), a protection plate 112 may be attached to the front surface of the substrate 117. The protection plate 112 may be larger than the required length and/or width for the completed display panel 110.

Referring to FIG. 12(b), the first and second resin portions 111a and 111b may be applied to substrate 117 and the protection plate 112, before the protection plate 112 is processed.

Referring to FIG. 12(c), the protection plate 112 may be processed after the application of the first and second resin portions 111a and 111b. The margin portion MP of the protection plate 112 may be removed after the application of the first and second resin portions 111a and 111b. In the process of removing the margin portion MP of the protection plate 112, an upper portion of the second resin portion 111b may also be removed together. The height of the outer circumferential side of the protection plate 112 and the height of the upper side of the second resin portion 111b may be substantially equal to each other.

FIGS. 13 to 18 are views showing the structure of the display device of FIG. 1.

The display device 100 according to an embodiment of the present invention may have a structure capable of preventing a component of the display device 100 from being damaged due to an external force.

Figure 13:
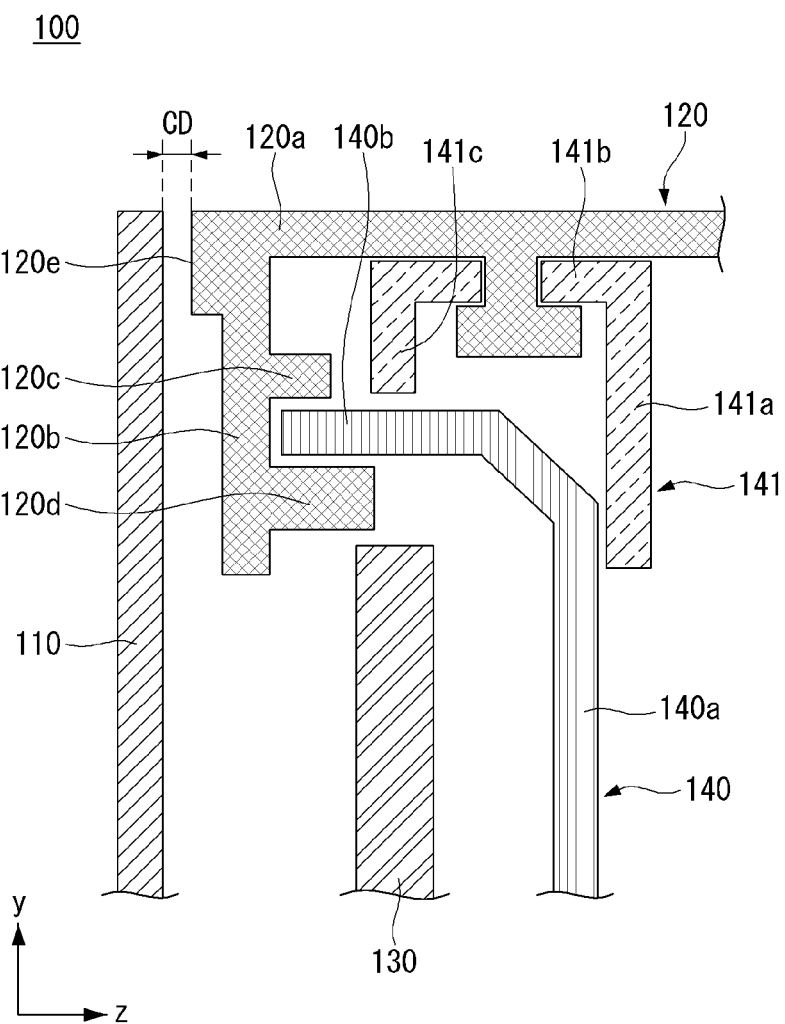
FIGS. 13 to 18 are views showing the structure of the display device of FIG. 1.

FIG. 13 is a diagram showing a cross section of the display device 100. The backlight unit 130 may be disposed on a rear surface of the display panel 110. The frame 140 may be disposed on a rear surface of the backlight unit 130. The guide panel 120 may be positioned on a side surface of the backlight unit 130.

The support clip 141 may be fixed to the frame 140. For example, one end of a first body 141a of the support clip 141 may be coupled with the frame 140. A second body 141b of the support clip 141 may be bent and extended from the first body 141a of the support clip 141. A third body 141c of the support clip 141 may be bent and extended from the second body 141b of the support clip 141.

The second body 141b of the support clip 141 may be in contact with the guide panel 120. For example, the second body 141b of the support clip 141 and the guide panel 120 may be in contact with each other in terms of surface contact. The deformation of the guide panel 120 may be minimized because the second body 141b of the support clip 141 is in contact with the guide panel 120. For example, when the guide panel 120 is deformed by an external force, the second body 141*b* of the support clip 141 may support the guide panel 120 to minimize deformation of the guide panel 120.

The second body 141*b* of the support clip 141 may be directly coupled with the guide panel 120. For example, an extended portion extended from the first body 120*a* of the guide panel 120 may be coupled with the second body 141*b* of the support clip 141. Due to the coupling of the extended portion of the first body 120*a* of the guide panel 120 and the second body 141*b* of the support clip 141, the support clip 141 may be secured in its initial position.

The third body 141*c* of the support clip 141 may be bent toward the frame 140. The end of the third body 141*c* of the support clip 141 may be in contact with or close to the second body 140*b* of the frame 140. When the guide panel 120 is deformed by an external force, the end of the third body 141*c* of the support clip 141 may contact the second body 140*b* of the frame 140 to minimize the deformation of the guide panel 120.

The guide panel 120 may have a stopper 120*c*. The stopper 120*c* may protrude backward or inward from the second body 120*b* of the guide panel 120. The stopper 120*c* may be adjacent to or in contact with a rear surface or an outer surface of the frame 140.

The stopper 120*c* may prevent the guide panel 120 from being deformed. Alternatively, the stopper 120*c* may prevent the guide panel 120 from being deformed more than a certain amount. For example, when a force is applied in the Y direction from the upper side of the guide panel 120, the stopper 120*c* may prevent the deformation of the guide panel 120.

The guide panel 120 may further include a protrusion 120*d*. The protrusion 120*d* may be extended inward or backward from the second body 120*b* of the guide panel 120. An end of the frame 140 may be fitted between the stopper 120*c* and the protrusion 120*d*. The structure of the stopper 120*c*, the protrusion 120*d*, and the frame 140, may prevent the guide panel 120 from deformation due to an external force.

The guide panel 120 may be positioned adjacent to the display panel 110. For example, the front end 120*e* of the guide panel 120 may be close to the display panel 110 as much as a distance CD. The distance CD between the display panel 110 and the front end 120*e* of the guide panel 120 may be within a few millimeters. In this state, when the guide panel 120 is deformed by an external force, the front end 120*e* may be in contact with the display panel 110. The support clip 141, the stopper 120*c* and/or the protrusion 120*d* of the display device 100 according to the embodiment of the present invention may prevent the guide panel 120 from being deformed.

Figure 14:
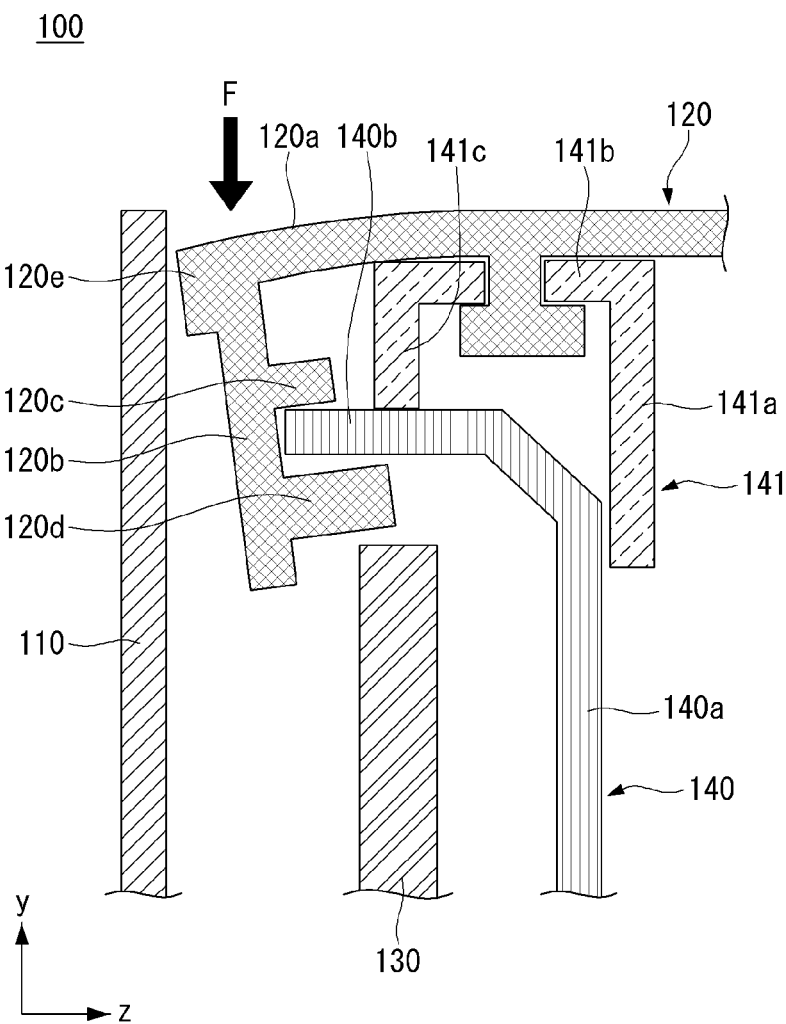

Referring to FIG. 14, an external force F may be applied to the guide panel 120. When the external force F is applied, the guide panel 120 may be deformed. As described above, the front end 120*e* of the guide panel 120 may be positioned adjacent to the display panel 110. The contact between the front end 120*e* and the display panel 110 even may be suppressed when the external force F is applied to the guide panel 120. The third body 141*c* of the support clip 141 may contact the second body 140*b* of the frame 140 to prevent the guide panel 120 from being deformed. The stopper 120*c* of the guide panel 120 may contact the second body 140*b* of the frame 140 to prevent the guide panel 120 from being deformed.

Figure 15:
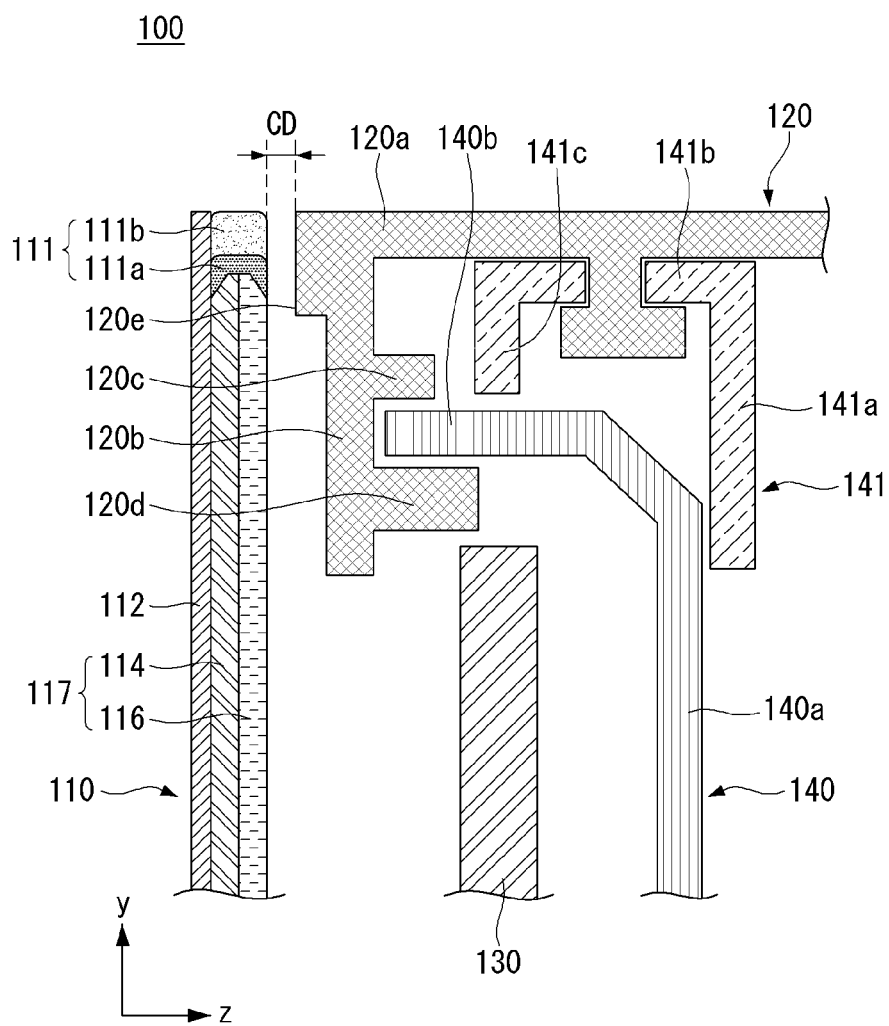

Referring to FIG. 15, the resin portion 111 may be positioned at an end of the display panel 110. The resin portion 111 may be composed of a plurality of layers. The front end 120*e* of the guide panel 120 may be brought into contact with the resin portion 111 rather than the rear substrate 116 even when the guide panel 120 which is close to the display panel 110 is excessively deformed. Therefore, breakage of the display panel 110 due to deformation of the guide panel 120 may be prevented.

Figure 16:
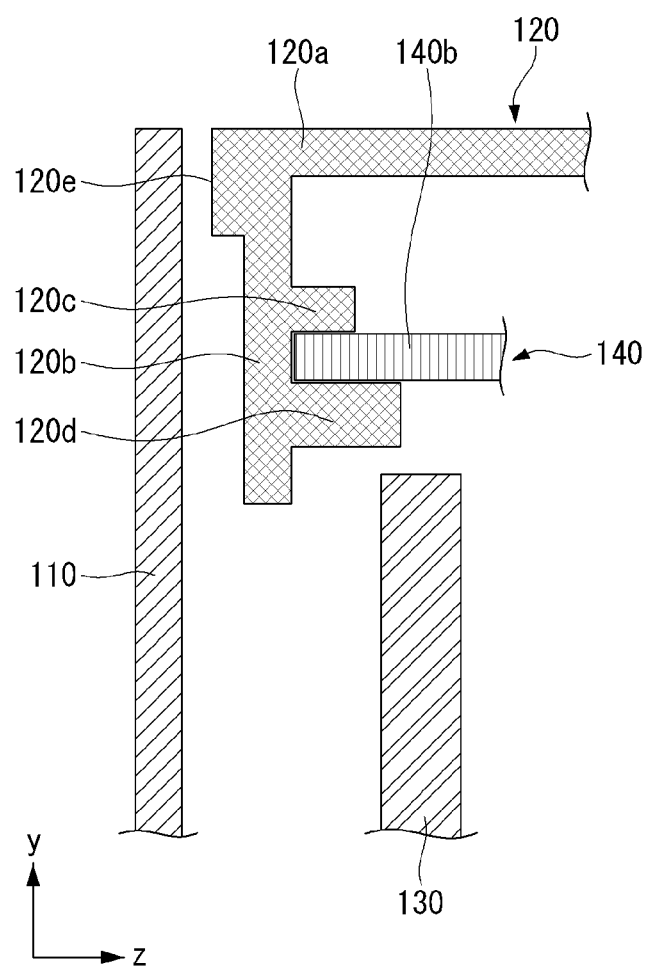

Referring to FIG. 16, the stopper 120*c* and the protrusion 120*d* may be brought into close contact with the frame 140. For example, the second frame body 140*b* may be coupled between the stopper 120*c* and the projection 120*d*. At least one of the stopper 120*c* and the protrusion 120*d* may be fixed to the frame 140 with a screw.

Figure 17:
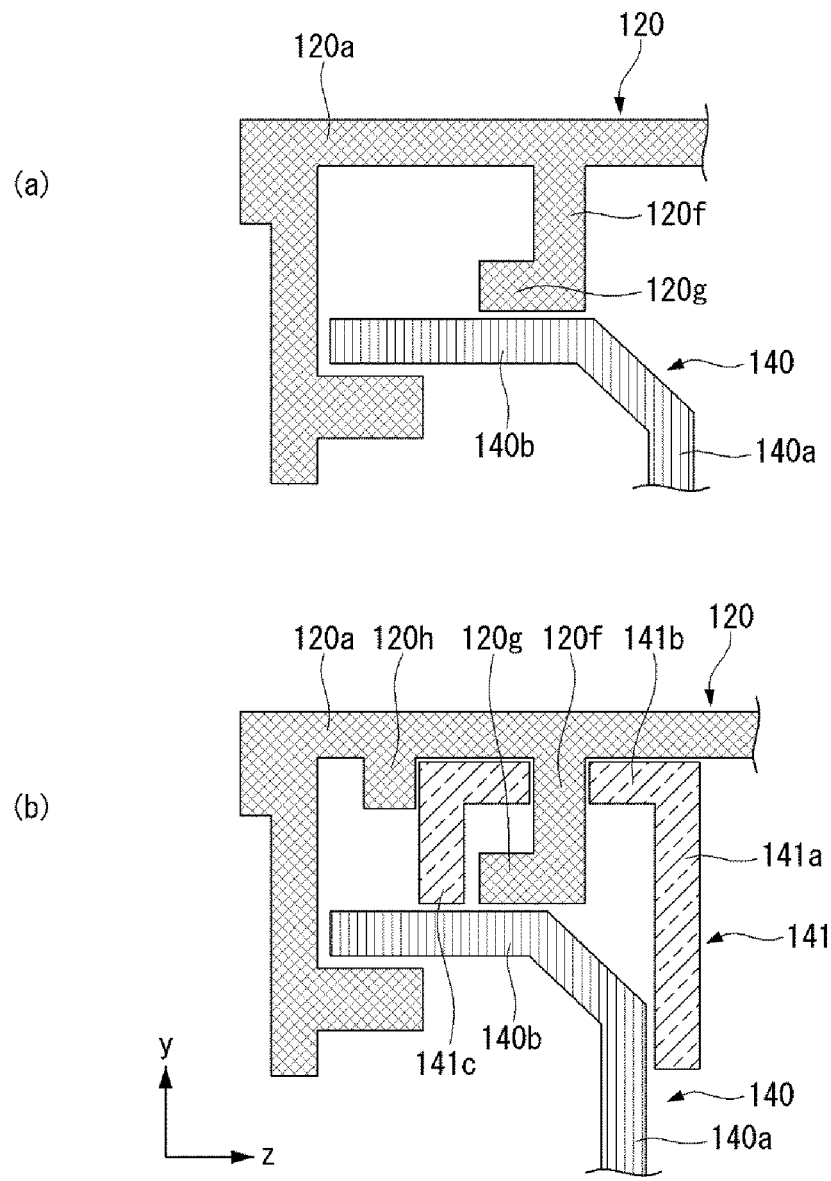

Referring to FIG. 17(*a*), there may be protrusions protruding from the guide panel 120 toward the frame 140. For example, a protrusion 120*f* of the guide panel 120 may be extended toward the second body 140*b* of the frame 140 from the first body 120*a* of the guide panel 120. For example, a contact portion 120*g* of the guide panel 120 may be extended from the protrusion 120*g* of the guide panel 120.

The contact portion 120*g* of the guide panel 120 may contact the second body 140*b* of the frame 140. Therefore, even when an external force is applied to the guide panel 120, the contact portion 120*g* of the guide panel 120 may prevent the guide panel 120 from being in contact with the display panel 110.

Referring to FIG. 17(*b*), a support clip 145 and a contact portion 120*g* of the guide panel 120 may be provided. The third body 141*c* of the support clip 141 and the contact portion 120*g* of the guide panel 120 may be in contact with the second body 140*b* of the frame 140.

A fixing protrusion 120*h* may be formed on the guide panel 120. The fixing protrusion 120*h* may be in contact with the supporting clip 141. The fixing protrusion 120*h* may support the supporting clip 141 so that the supporting clip 141 is fixed at a predetermined position.

Figure 18:
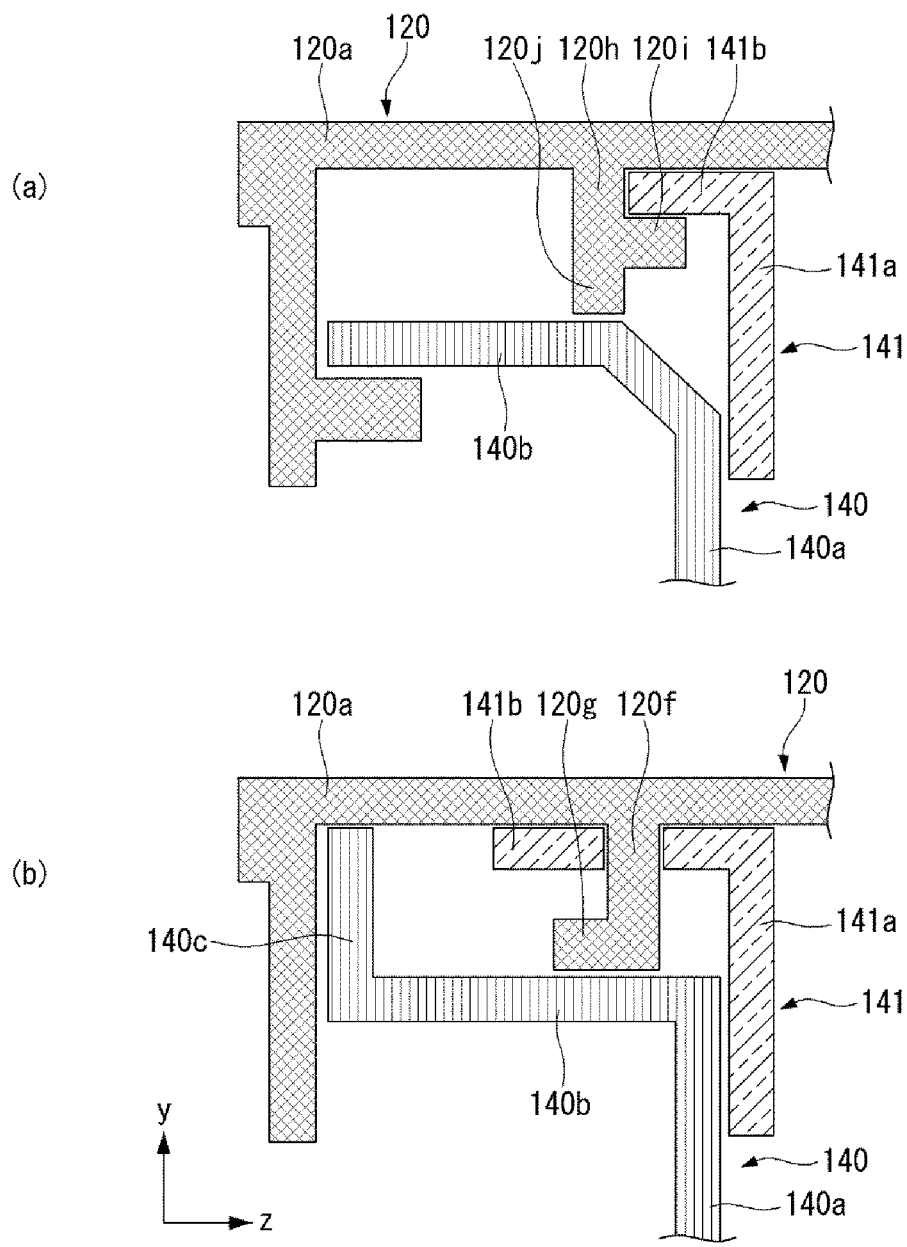

Referring to FIG. 18(*a*), the support clip 141 may be coupled with the guide panel 120. The second body 141*b* of the support clip 141 may be inserted into the first and second coupling protrusions 120*h* and 120*i*. Deformation of the guide panel 120 may be prevented because the second body 141*b* of the support clip 141 may support the first body 120*a* of the guide panel 120.

The third coupling protrusion 120*j* may be extended toward the frame 140 from the first coupling protrusion 120*h*. The third coupling protrusion 120*j* may be in contact with the frame 140. Deformation of the guide panel 120 may be prevented by the third coupling protrusion 120*j* contacting the frame 140.

Referring to FIG. 18(*b*), the frame 140 may directly support the guide panel 120. For example, the third body 140*c* extended from the second body 140*b* of the frame 140 may be in contact with the first body 120*a* of the guide panel 120. Deformation of the guide panel 120 may be prevented by the third body 140*c* of the frame 140 supporting the first body 120*a* of the guide panel 120.

FIGS. 19 to 33 are views showing a coupling structure of the display device of FIG. 1.

The display device according to an embodiment of present invention may include a guide 142.

Figure 19:
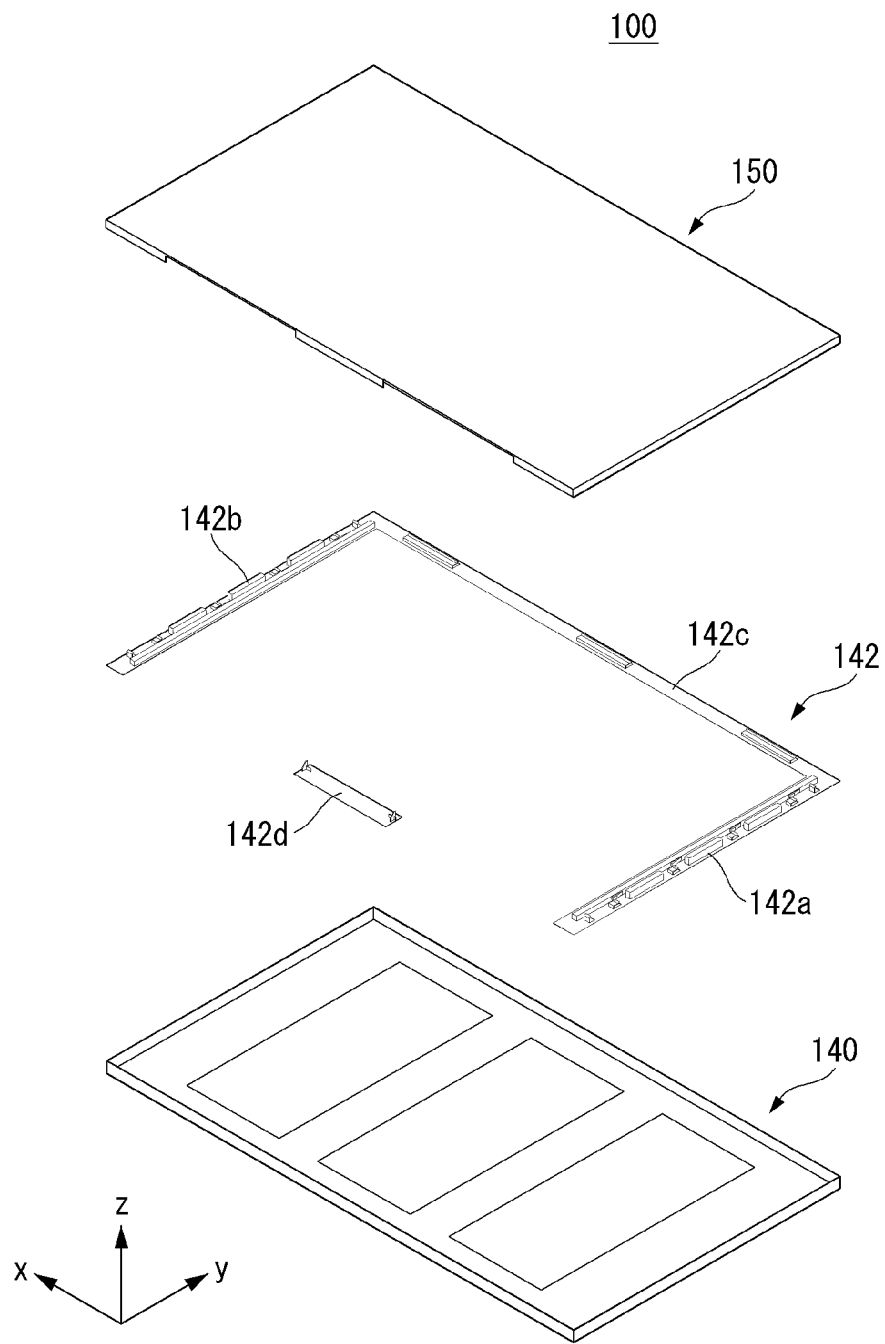
FIGS. 19 to 33 are views showing a coupling structure of the display device of FIG. 1.

Referring to FIG. 19, the guide 142 may be formed separately from the frame 140 and coupled with the frame 140. Alternatively, the guide 142 may be formed integrally with the frame 140 by machining the outer peripheral region of the frame 140. The guide 142 may be coupled with the frame 140 using a screw.

The guide 142 may include a plurality of portions. For example, the guide 142 may include first to fourth portions 142*a* to 142*d*. The first and second portions 142*a* and 142*b* of the guide 142 may be coupled with the first and second short sides of the frame 140 respectively. The third portion 142*c* of the guide 142 may be coupled with the first long side of the frame 140. The fourth portion 142*d* of the guide 142 may be coupled with the second long side of the frame 140.

At least one of the first to fourth portion 142*a* to 142*d* of the guide 142, may be formed separately from the others. For example, the fourth portion 142*d* of the guide 142 may be formed separately from the first to third portions 142*a* to 142*c* of the guide 142.

Figure 20:
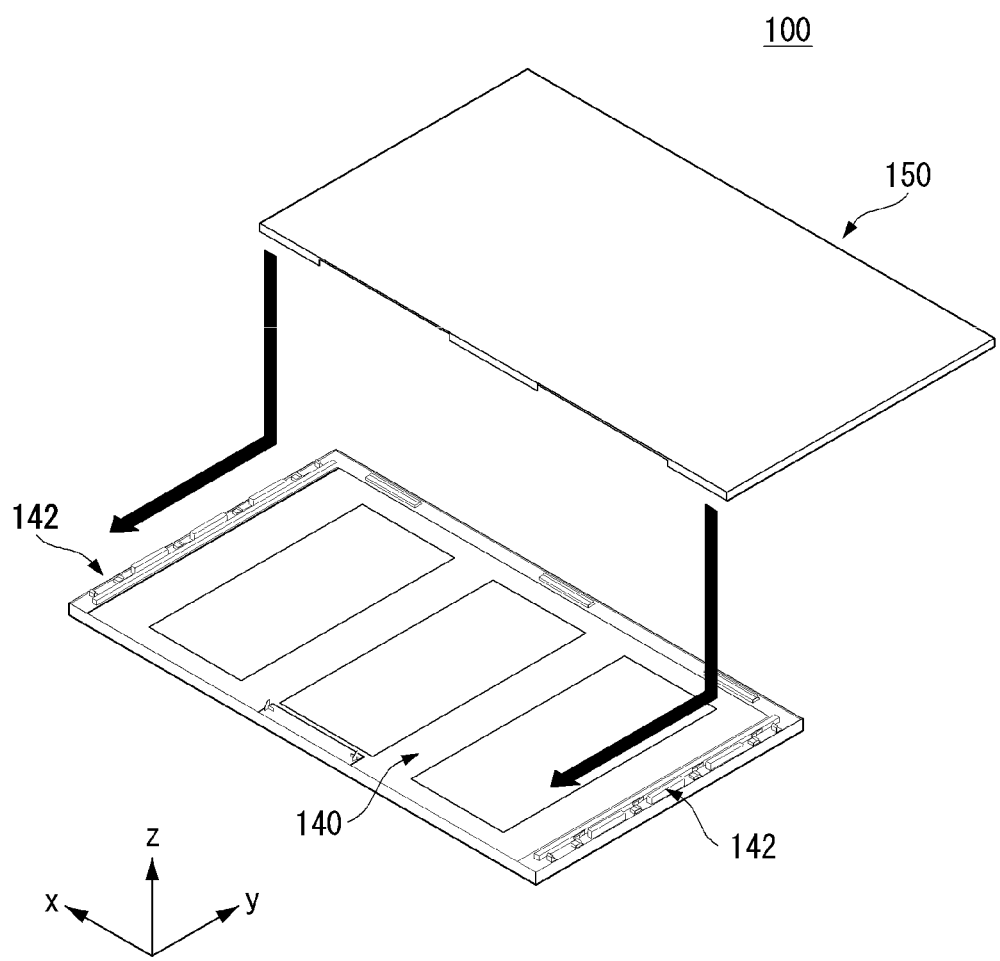

Referring to FIG. 20, the back cover 150 may be coupled with the rear side of the frame 140. The back cover 150 may be slidably coupled with the frame 140. The back cover 150 may be coupled with the frame 140 by approaching from the rear of the frame 140 toward the frame 140 and sliding in a direction.

Figure 21:
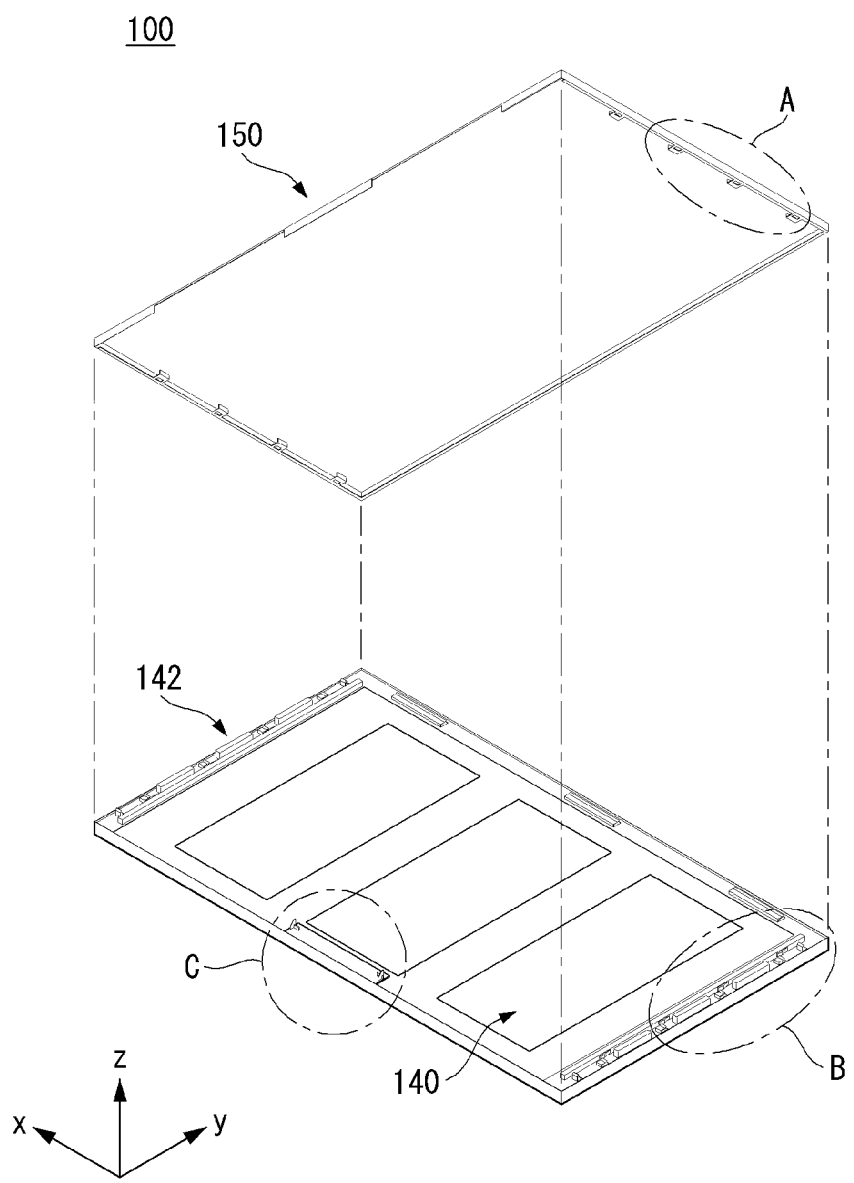

Referring to FIG. 21, the guide 142 may be coupled with the frame 140. The back cover 150 may include a configuration corresponding to the guide 142 coupled to the frame 140. Hereinafter, A, B and C regions will be described.

Figure 22:
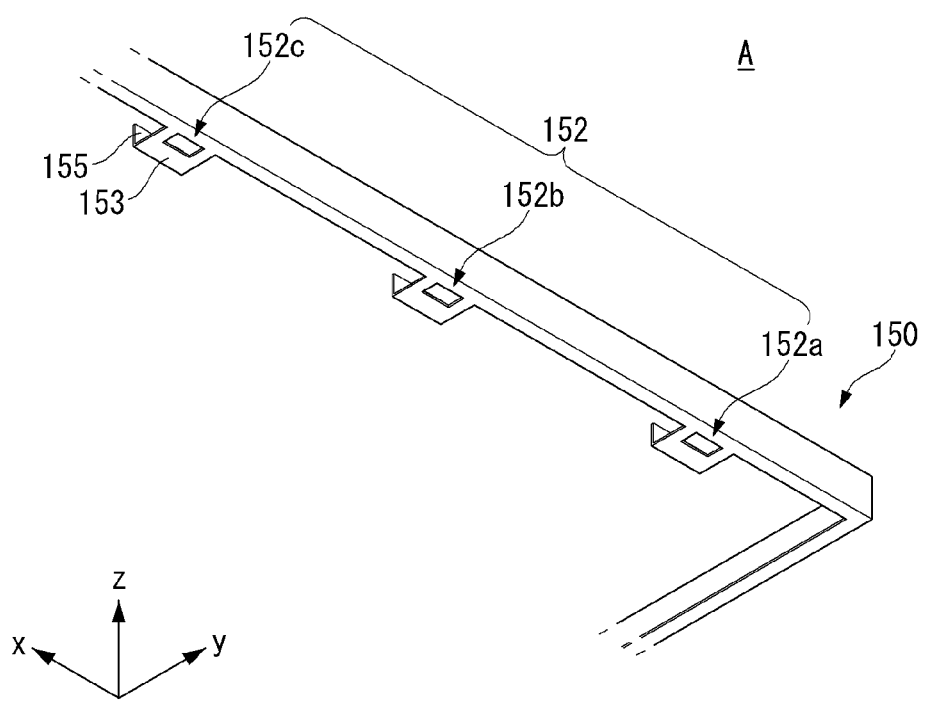

Referring to FIG. 22, a plurality of flanges 152 may be formed on the inner side of the back cover 150. For example, the first to third flanges 152*a* to 152*c* spaced apart from each other may be positioned at the back cover 150.

The flange 152 may include a first body 153 extended from the back cover 150 and a second body 155 bent and extended inwardly from the first body 153. The first body 153 of the flange 152 may be in contact with the guide 142 coupled to the frame 140.

Figure 23:
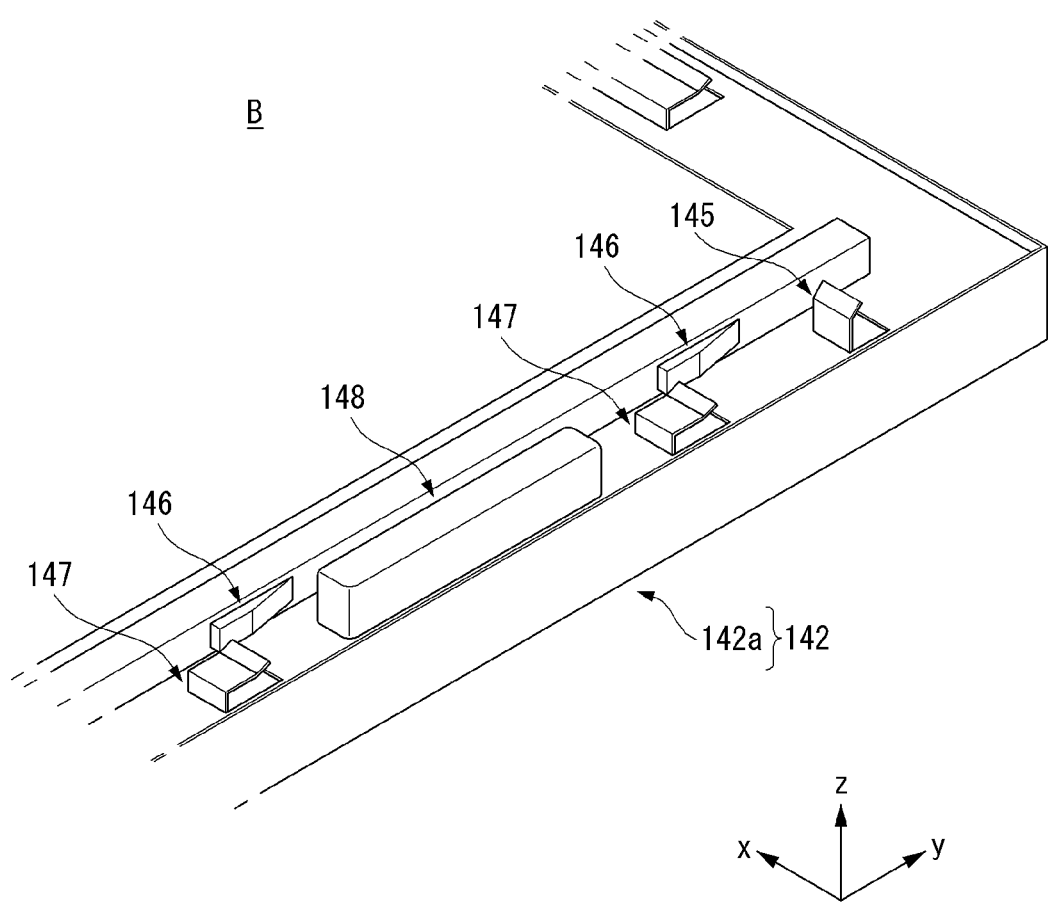

Referring to FIG. 23, a structure may be formed in the guide 142 so that the flange 152 of the back cover 150 is slidingly coupled with the guide 142. For example, first to fourth guides 145, 146, 147, and 148 may be formed.

At least one of the first to fourth guides 145 to 148 may be formed repeatedly along the long side. For example, the second, third, and fourth guides 146, 147, and 148 may be repeatedly formed along the long side of the frame 140. One set of guides 146 to 148 that is repeatedly formed may correspond to one flange 152 formed on the back cover 150.

Figure 24:
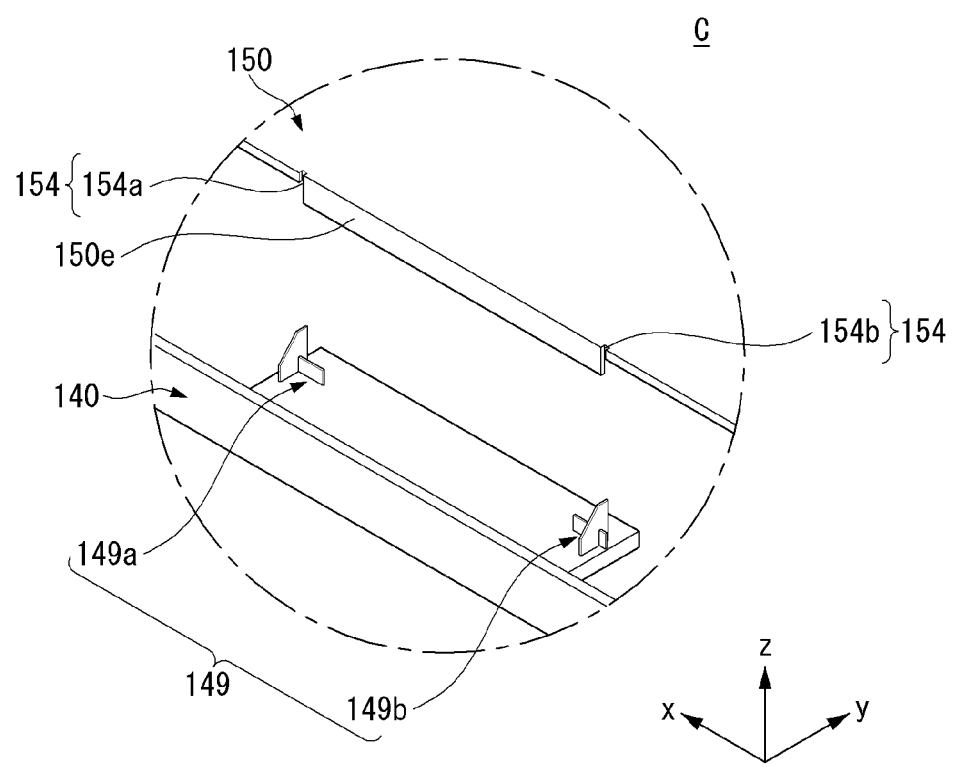

Referring to FIG. 24, a fifth guide 149 may be placed on the frame 140. The fifth guide may have a shape of a cross.

The fifth guide 149 may include a first portion 149*a* and a second portion 149*b*. The first portion 149*a* of the fifth guide 149 may be spaced apart from the second portion 149*b* of the fifth guide 149.

The back cover 150 may have an extended portion 150*e* between the slits 154. The slits 154 may include a first slit 154*a* and a second slit 154*b*. The first slit 154*a* may be corresponding to the first portion 149*a* of the fifth guide 149. The second slit 154*b* may be corresponding to the second portion 149*b* of the fifth guide 149.

FIGS. 25 to 33 illustrate sliding engagement of the back cover 150 using the above-described structure.

Figure 25:
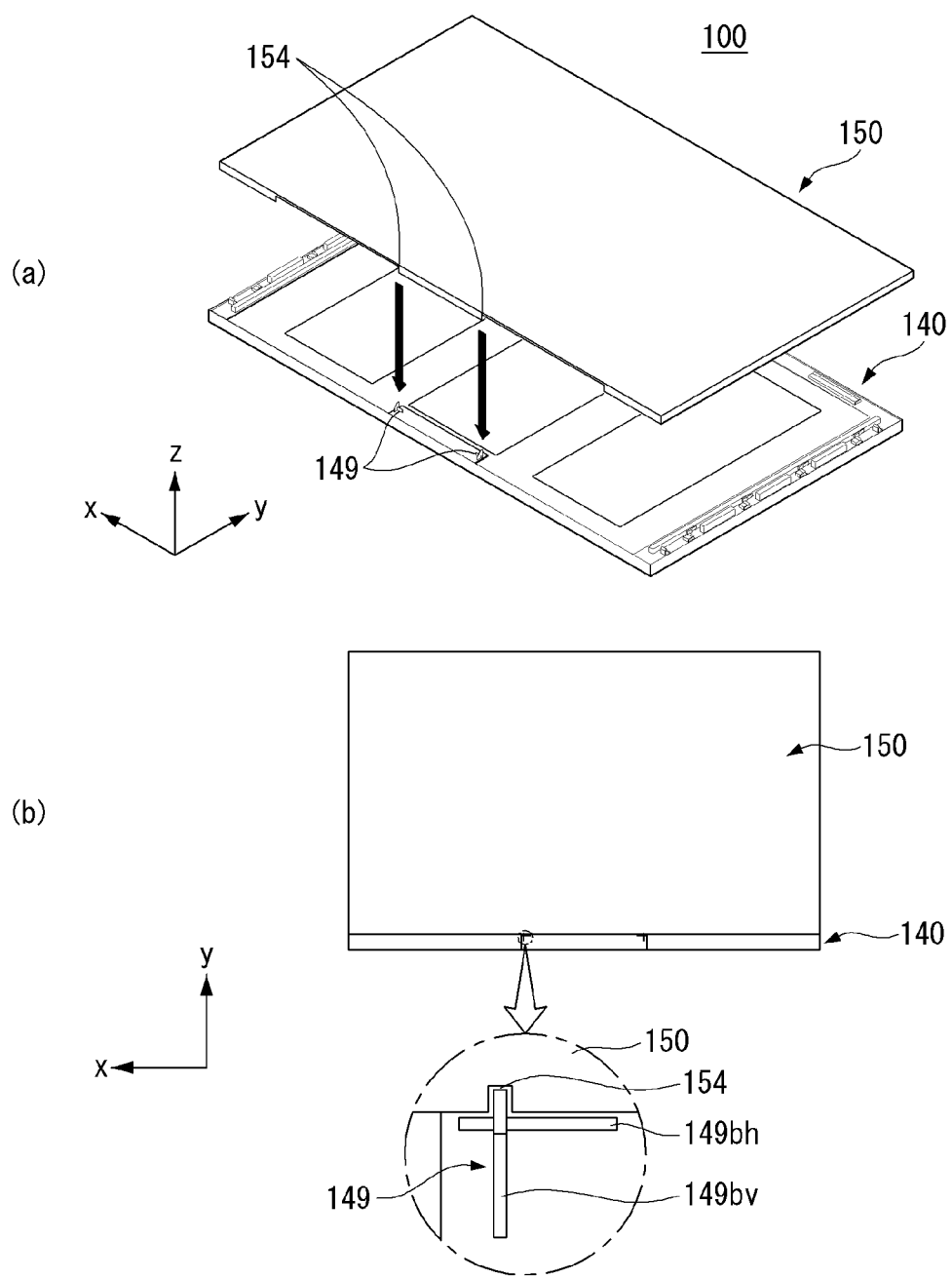

Referring to FIG. 25(*a*), the back cover 150 may approach to the frame 140 by an operator. The slit 154 of the back cover 150 may be located at the position corresponding to the fifth guide 149 of the frame 140.

Referring to FIG. 25(*b*), the vertical plate 149*bv* of the fifth guide 149 may be inserted into the slit 154. When the vertical plates 149*bv* of the first and second portions 149*a* and 149*b* of the fifth guide 149 are inserted into the two slits 154, the back cover 150 may be aligned in terms of the x-direction.

The lower surface of the back cover 150 may be positioned on the horizontal plate 149*bh* of the fifth guide 149.

Figure 26:
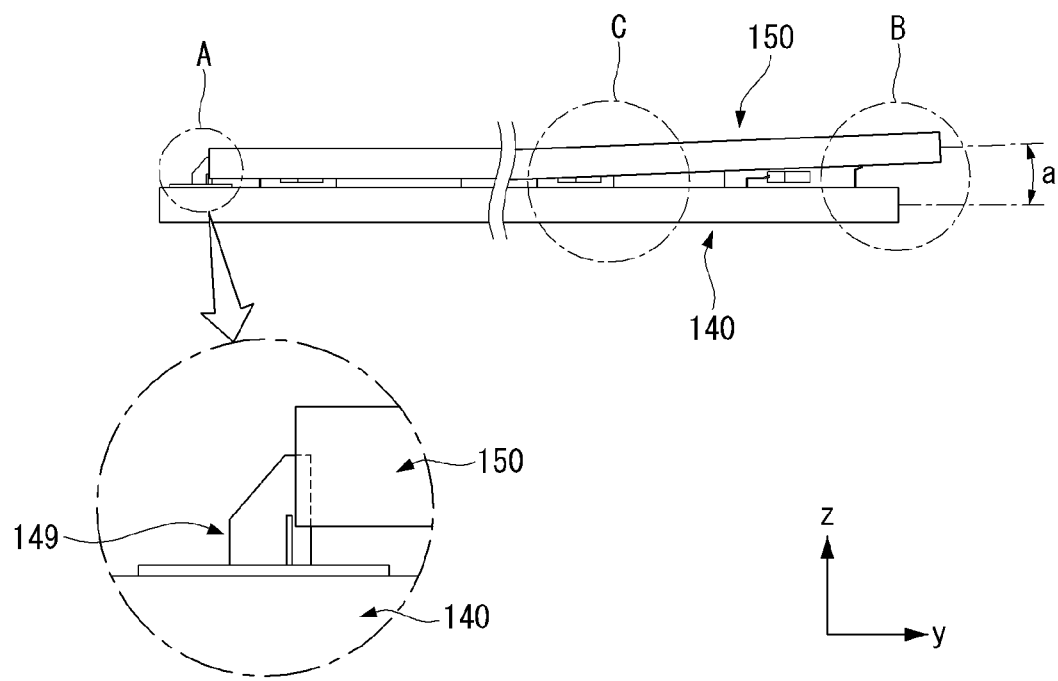

Referring to FIG. 26, when the bottom portion of the back cover 150 is inserted into the fifth guide 149, the back cover 150 and the frame 140 may form an angle a. That is, the bottom portion of the back cover 150 may be close to the frame 140 and the top portion of the back cover 150 may be spaced apart from the frame 140. In this state, the back cover 150 may be easily slid in the Y direction.

Figure 27:
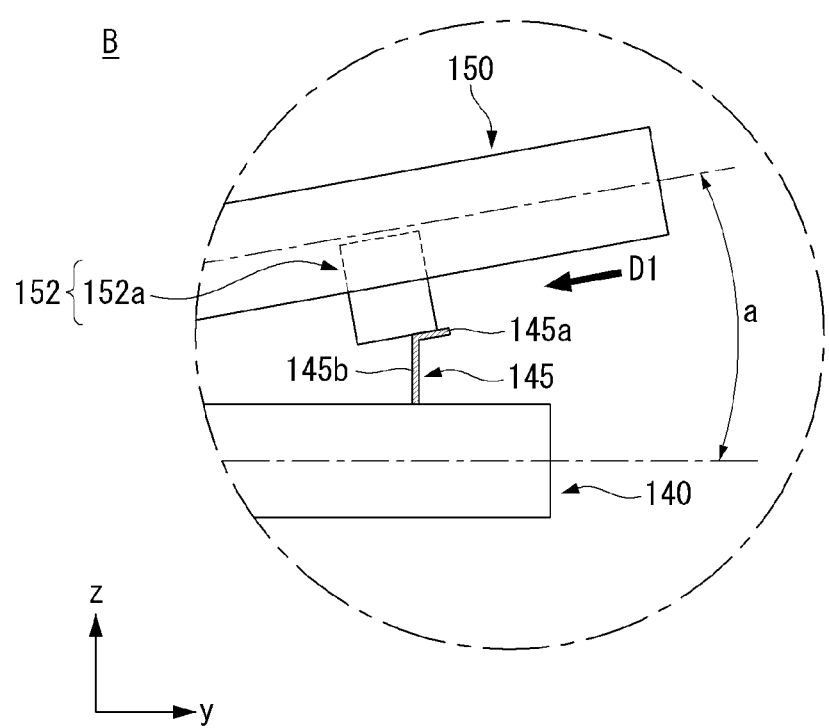

Referring to FIG. 27, when the bottom portion of the back cover 150 is inserted into the fifth guide 149, the flange 152 of the back cover 150 may be placed upon the first guide 145.

The first guide 145 may include a body portion 145*b* extended toward the back cover 150 from the frame 140 and a support portion 145*a* extended from the body portion 145*b*. The support portion 145*a* may be formed obliquely with respect to the body portion 145*b*. The first flange 152*a* may be placed on the support portion 145*a* of the first guide 145. The back cover 150 may smoothly slide in a direction D1.

Figure 28:
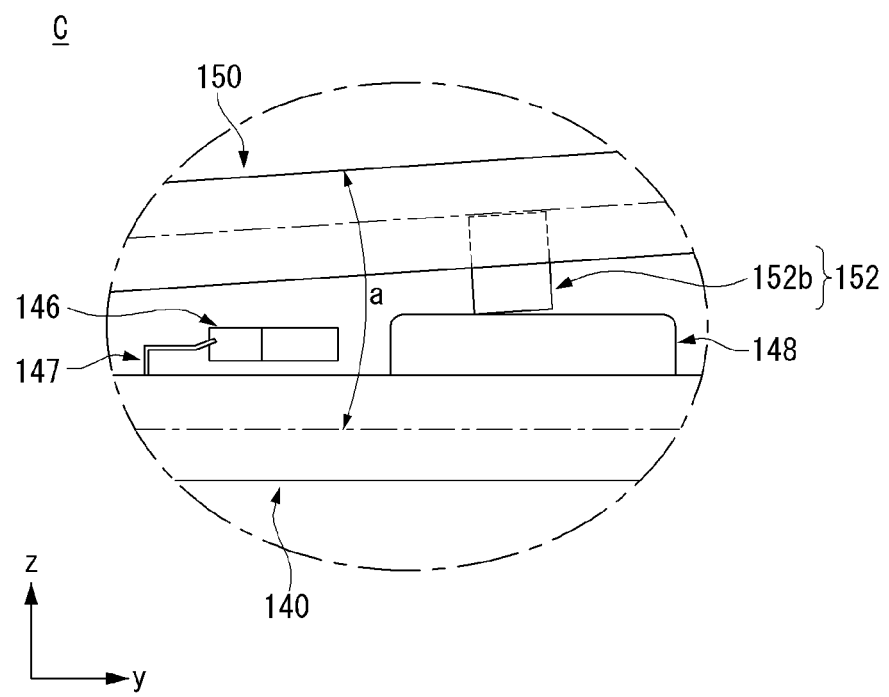

Referring to FIG. 28, at least one of the flanges 152 may be positioned on the fourth guide 148. For example, the second flange 152*b* may be positioned on the fourth guide 148.

Figure 29:
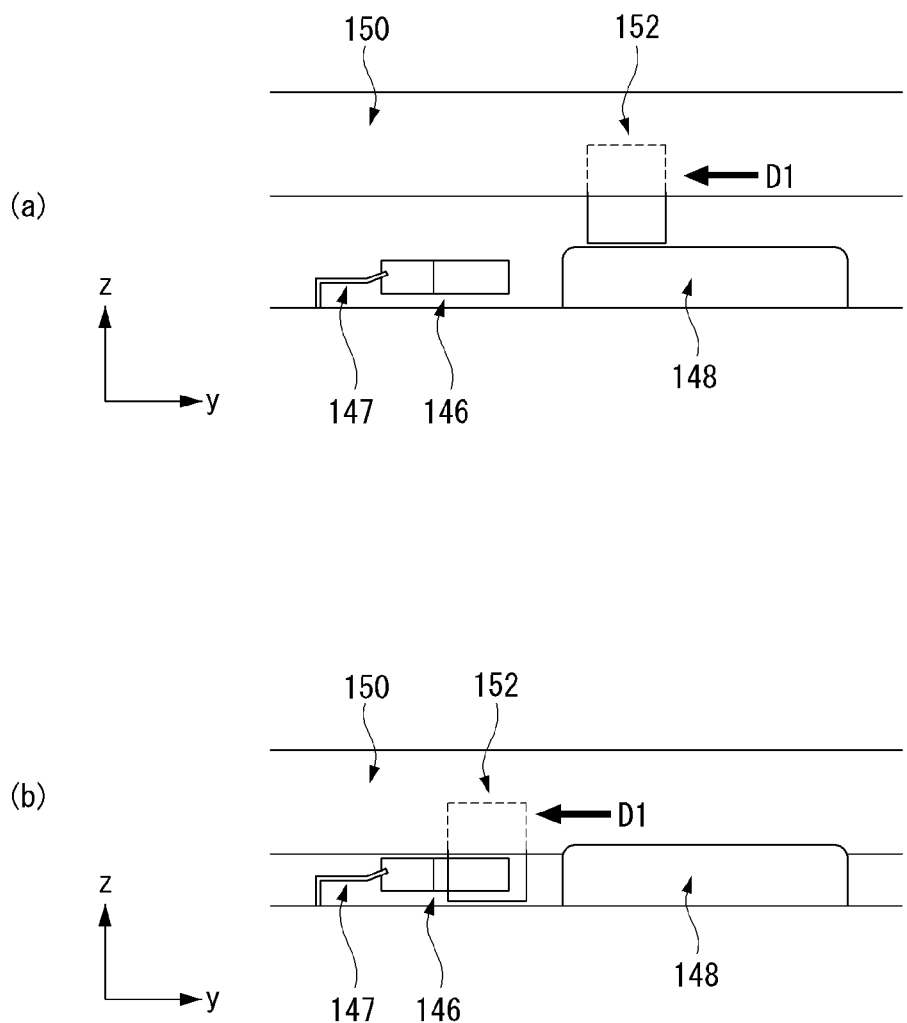

Referring to FIG. 29(*a*), the back cover 150 may slide in the direction D1 in a state in which the flange 152 is mounted on the fourth guide 148.

Referring to FIG. 29(*b*), the flange 152 sliding on the fourth guide 148 may be moved beside the fourth guide 148.

The flange 152 beside the fourth guide 148, may contact on the second guide 146.

Figure 30:
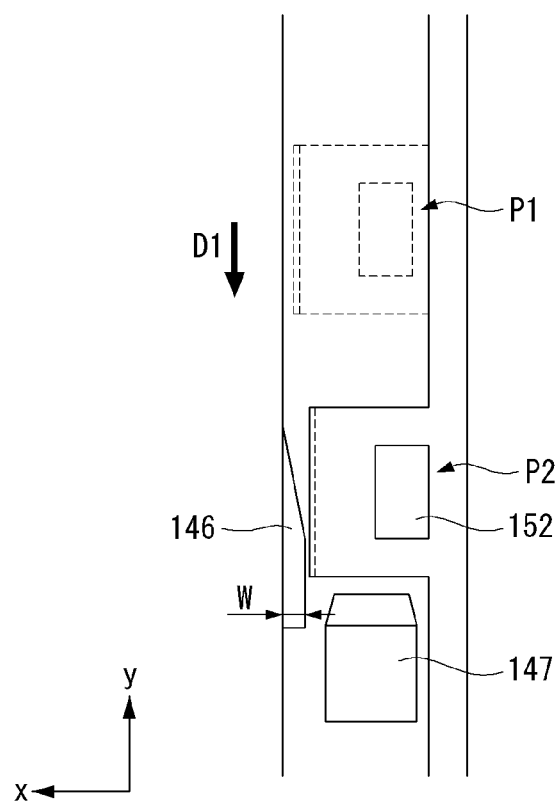
Figure 31:
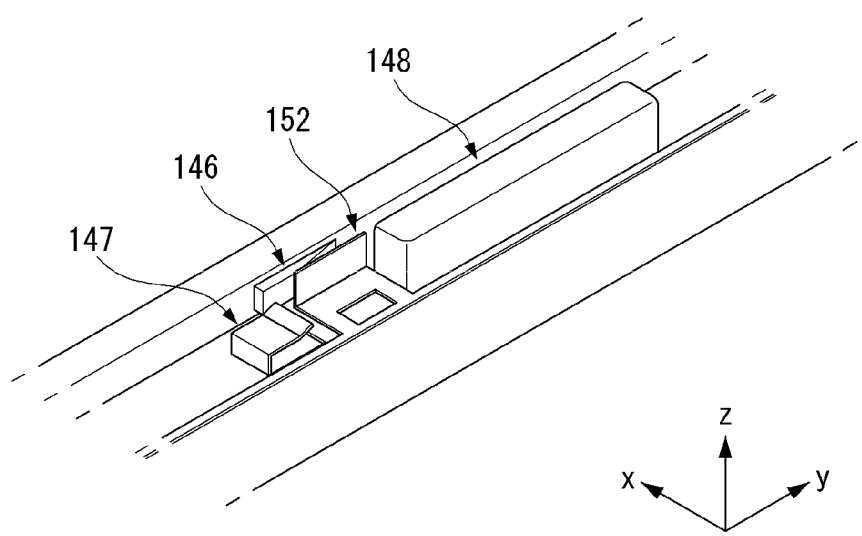

Referring to FIGS. 30 and 31, the second guide 146 may protrude inwardly as much as a width W. Therefore, the second guide 146 may press the side surface of the flange 152. For example, when the flange 152 moves from the first position P1 to the second position P2, the second guide 146 may contact the side surface of the flange 152. When the flange 152 is pressed by the second guide 146, the noise and/or vibration generated by the flange 152 contacting the other structure can be prevented.

Figure 32:
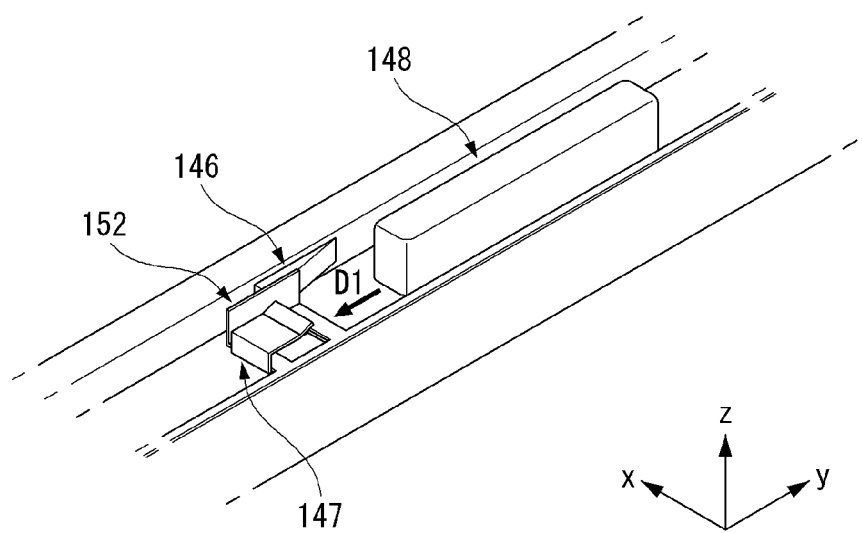

Referring to FIG. 32, when the flange 152 is continuously slid in the direction D1, the flange 152 may be inserted into the third guide 147. The flange 152 inserted into the third guide 147 may be coupled with and fixed to the third guide 147.

Figure 33:
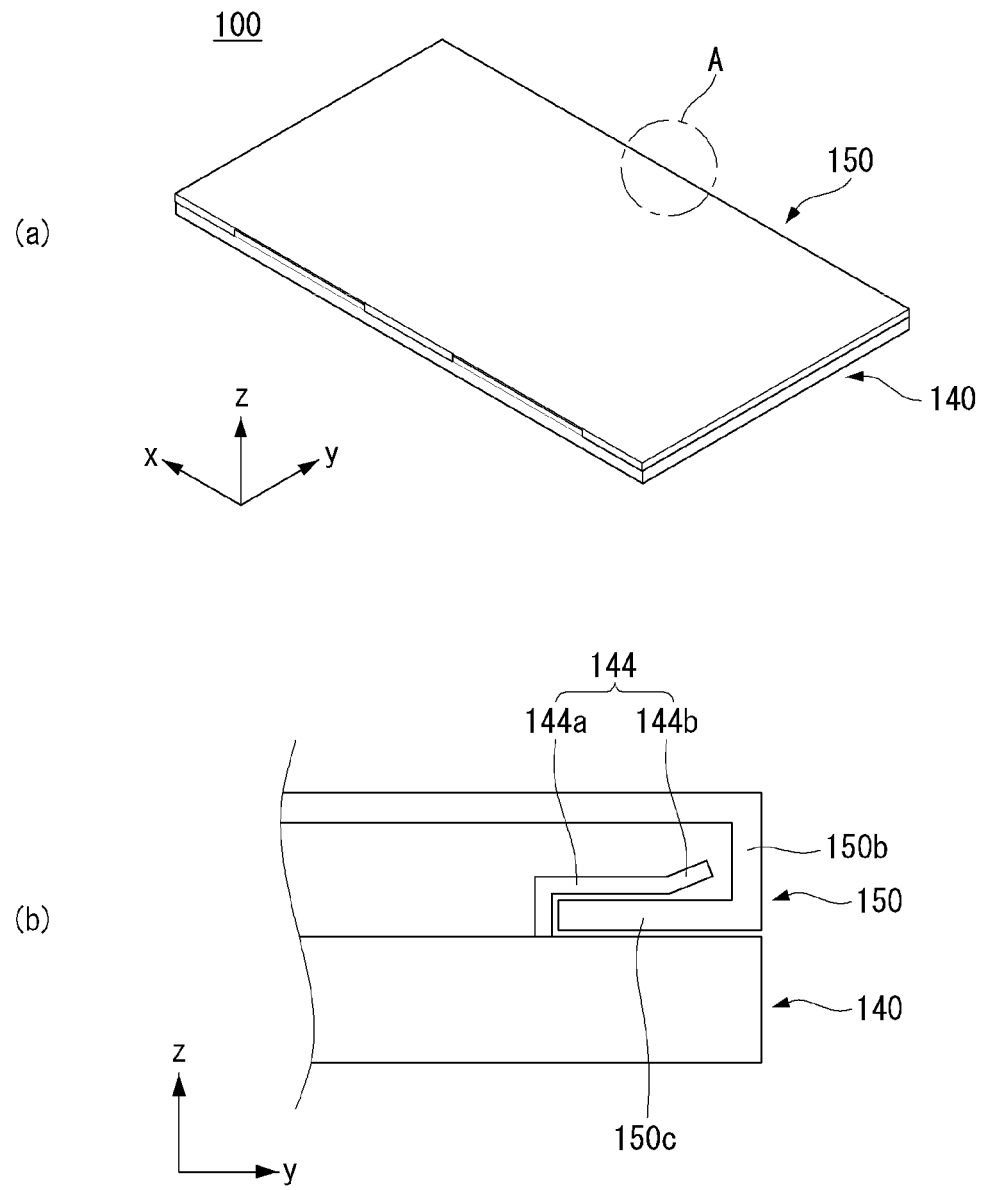

Referring to FIG. 33(*a*), the back cover 150 may be coupled with the frame 140.

Referring to FIG. 33(*b*), a sixth guide 144 is provided in a top region of the frame 140. A banding portion 150*c* of the back cover 150 may be bent and extended toward the frame 140 from an end of the back cover 150. The bending portion 150*c* of the back cover 150 may be bent inwardly. The bending portion 150*c* of the back cover 150 may be smoothly coupled with the sixth guide 144, when the back cover 150 is coupled with the frame 140.

The sixth guide 144 may include a body portion 144*a* and an end portion144*b* extending from the body portion 144*a*. The end portion 144*b* of the sixth guide 144 may be in an upwardly inclined form. Therefore, the bending portion 150*c* of the back cover 150 may naturally be moved to the inside of the body portion 144*a* of the sixth guide 144 along the end portion 144*b* of the fifth guide 144.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
    a display panel including a front substrate and a rear substrate, the rear substrate coupled with a rear portion of the front substrate;
    a frame positioned at a rear of the display panel;
    a guide panel coupled with a side portion of the frame and partially exposed to outside of the display device;
    a protection plate attached to a front surface of the front substrate,
    wherein an area of a rear surface of the protection plate is larger than an area of the front surface of the front substrate;
    a resin portion attached to the rear surface of the protection plate, a side surface of the front substrate, and a side surface of the rear substrate; and
    a support clip to minimize a deformation of the guide panel by an external force,
    wherein when the guide panel is deformed by the external force, an end of the support clip contacts the frame to minimize the deformation of the guide panel,
    wherein the guide panel includes a first part and a second part,
    wherein the first part of the guide panel is deformable inward by the external force and an end of the first part of the guide panel is spaced from the display panel,
    wherein the second part of the guide panel is supported by the support clip to prevent the second part of the guide panel from being deformed inward by the external force,
    wherein the frame includes a first frame body formed parallel to the display panel and a second frame body formed from the first frame body toward the display panel,
    wherein the guide panel includes a first guide body and a second guide body, and
    wherein the second guide body is positioned between the display panel and an end of the second frame body.

2. The display device of claim 1, wherein the end of the support clip is coupled with the frame, and at least a portion of the support clip is in contact on the guide panel,
    wherein the end of the support clip is coupled with a rear of the frame, and
    wherein another end of the support clip is positioned adjacent to the side portion of the frame.

3. The display device of claim 2, wherein the at least the portion of the support clip is between the end of the support clip and the another end of the support clip, and
    wherein the at least the portion of the support clip is in contact with an inner surface of the guide panel.

4. The display device of claim 2, wherein the end of the support clip is coupled with a rear surface of the frame, and wherein the another end of the support clip is coupled with the guide panel.

5. The display device of claim 1, wherein the first part of guide panel includes:
    a stopper protruding toward the frame, and positioned adjacent to a rear surface of the frame,
    a protrusion protruding toward the frame and positioned adjacent to a front surface of the frame.

6. The display device of claim 5, wherein the end of the second frame body is positioned between the stopper and the protrusion.

7. The display device of claim 1, wherein the guide panel comprises:
    a protrusion extended toward the frame, the protrusion positioned adjacent to a rear surface of the frame; and
    a contact portion bent and extended from the protrusion, the contact portion in contact with the rear surface of the frame, and the contact portion aligned along the rear surface of the frame.

8. The display device of claim 1, wherein an end of the frame is extended to be in contact with a side portion of the guide panel.

9. The display device of claim 1, wherein the guide panel is placed adjacent to a rear surface of the display panel.

10. The display device of claim 1, further comprising a backlight unit between the display panel and the frame.

11. The display device of claim 1, wherein the resin portion is exposed to an outside.

12. The display device of claim 1, wherein the resin portion includes:
    a first resin portion in contact with the display panel; and
    a second resin portion in contact with the first resin portion,
    wherein the first resin portion is between the display panel and the second resin portion, and
    wherein one of the first resin portion and the second resin portion is softer than another of the first resin portion and the second resin portion.

13. The display device of claim 1, wherein the display panel includes an inclined portion, and
    wherein the inclined portion of the display panel is formed on at least one of the side surface of the front substrate and the side surface of the rear substrate.

14. The display device of claim 1, wherein an area of the front substrate is different from an area of the rear substrate.

15. The display device of claim 1, wherein the resin portion includes a plurality of layers, and
    wherein a portion of the resin portion protrudes with respect to the protection plate.

16. The display device of claim 1, wherein the guide panel is positioned at the rear of the display panel.

17. The display device of claim 1, wherein the rear surface of the protection plate includes:
    a first area attached to the front surface of the front substrate; and
    a second area surrounding the first area.

18. The display device of claim 1, wherein the display panel further comprises:
    a first inclined portion formed on the front substrate; and
    a second inclined portion formed on the rear substrate.

19. The display device of claim 18, wherein the display panel further comprises:
    a flat portion connecting the first inclined portion with the second inclined portion.

20. The display device of claim 1, wherein the support clip further comprises:
- a first body of the support clip coupled with the frame;
- a second body of the support clip bent and extended from the first body of the support clip; and
- a third body of the support clip bent and extended from the second body of the support clip.

21. The display device of claim 20, wherein the second body of the support clip is in contact with the guide panel, and
- wherein when the guide panel is deformed by the external force, the second body of the support clip supports the guide panel to minimize deformation of the guide panel.

22. The display device of claim 20, wherein an end of the third body of the support clip is in contact with the frame to minimize the deformation of the guide panel.

23. The display device of claim 20, wherein an end of the third body of the support clip is close to the frame, and
- wherein when the guide panel is deformed by the external force, the end of the third body of the support clip contacts the frame to minimize the deformation of the guide panel.

\* \* \* \* \*